(12) United States Patent
Iwamatsu et al.

(10) Patent No.: US 10,075,093 B2
(45) Date of Patent: Sep. 11, 2018

(54) POWER CONVERSION DEVICE FOR SUPPRESSING FLUCTUATION OF COMMON MODE VOLTAGE

(71) Applicant: Panasonic Intellectual Property Management Co., Ltd., Osaka (JP)

(72) Inventors: Yusuke Iwamatsu, Osaka (JP); Shusaku Goto, Kyoto (JP); Akira Terasawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/524,470

(22) PCT Filed: Nov. 6, 2015

(86) PCT No.: PCT/IB2015/002063
§ 371 (c)(1),
(2) Date: May 4, 2017

(87) PCT Pub. No.: WO2016/075519
PCT Pub. Date: May 19, 2016

(65) Prior Publication Data
US 2017/0324352 A1 Nov. 9, 2017

(30) Foreign Application Priority Data
Nov. 12, 2014 (JP) .................... 2014-230072

(51) Int. Cl.
*H02M 7/487* (2007.01)
*H02M 7/48* (2007.01)
(Continued)

(52) U.S. Cl.
CPC ............. *H02M 7/487* (2013.01); *H02M 7/48* (2013.01); *H02M 7/483* (2013.01);
(Continued)

(58) Field of Classification Search
CPC .... H02M 7/483; H02M 7/487; H02M 7/5387; H02M 3/156–3/158
(Continued)

(56) References Cited

U.S. PATENT DOCUMENTS 3,867,643 A * 2/1975 Baker .................. H02M 7/49
307/117
9,136,695 B2 9/2015 Takizawa
(Continued)

FOREIGN PATENT DOCUMENTS

JP    S50-107422 A     8/1975
JP    2013-258862 A    12/2013
(Continued)

OTHER PUBLICATIONS

International Search Report for corresponding International Application No. PCT/IB2015/002063 dated Jan. 19, 2016.
(Continued)

*Primary Examiner* — Yemane Mehari
(74) *Attorney, Agent, or Firm* — Renner Otto Boisselle & Sklar, LLP

(57) ABSTRACT

Provided is a power conversion device capable of suppressing common-mode voltage fluctuation resulting from output voltage transitioning. A power conversion device 1 is provided with N voltage control units $2_1$ to $2_N$, a full-bridge conversion unit having four switches QB1 to QB4, a clamp unit having holding switches QC1 and QC2, and a control unit 5. The control unit controls the four switches QB1 to QB4, the holding switches QC1 and QC2, the pairs of regenerative switches $Q1_1$ to $Q1_N$ and $Q2_1$ to $Q2_N$ and pairs of input switches $Q3_1$ to $Q3_N$ and $Q4_1$ to $Q4_N$ of each of the N voltage control units $2_1$ to $2_N$. As a result, the control unit can switch an output voltage V1 between 2N+3 levels.

18 Claims, 27 Drawing Sheets

(51) Int. Cl.
*H02M 7/483* (2007.01)
*H02M 7/5387* (2007.01)
*H02M 1/12* (2006.01)

(52) U.S. Cl.
CPC .... *H02M 7/5387* (2013.01); *H02M 2001/123* (2013.01); *Y10T 307/707* (2015.04)

(58) Field of Classification Search
USPC ........................................ 363/131, 132, 137
See application file for complete search history.

(56) References Cited

U.S. PATENT DOCUMENTS

| | | | | |
|---|---|---|---|---|
| 9,806,618 | B2* | 10/2017 | Kidera | H02M 7/5387 |
| 9,831,778 | B2* | 11/2017 | Kidera | H02M 3/158 |
| 2014/0063884 | A1* | 3/2014 | Itoh | H02M 7/487 |
| | | | | 363/132 |

FOREIGN PATENT DOCUMENTS

| | | |
|---|---|---|
| JP | 2014-050134 A | 3/2014 |
| JP | 2014-064431 A | 4/2014 |
| WO | 2010/051645 A1 | 5/2010 |
| WO | WO 2010051645 A1 * 5/2010 | ............ H02M 7/483 |
| WO | 2012/132127 | 10/2012 |

OTHER PUBLICATIONS

Extended European Search Report dated Jun. 12, 2018 issued in corresponding European Patent Application No. 15859808.6.
M. R. Banaei et al: "Novel Cell Flying Capacitor Converter Topology with Significant Reduction in Number of Components", International Journal of Emerging Electiric Power Systems, vol. 15, No. 4, Jan. 1, 2014, pp. 411-418.
Su G-J: "Multilevel DC-Link Inverter", IEEE Transaction on Industry Applications, IEEE Service Center, Piscataway, NJ, US, vol. 41, No. 3, May 1, 2005, pp. 848-854.

* cited by examiner

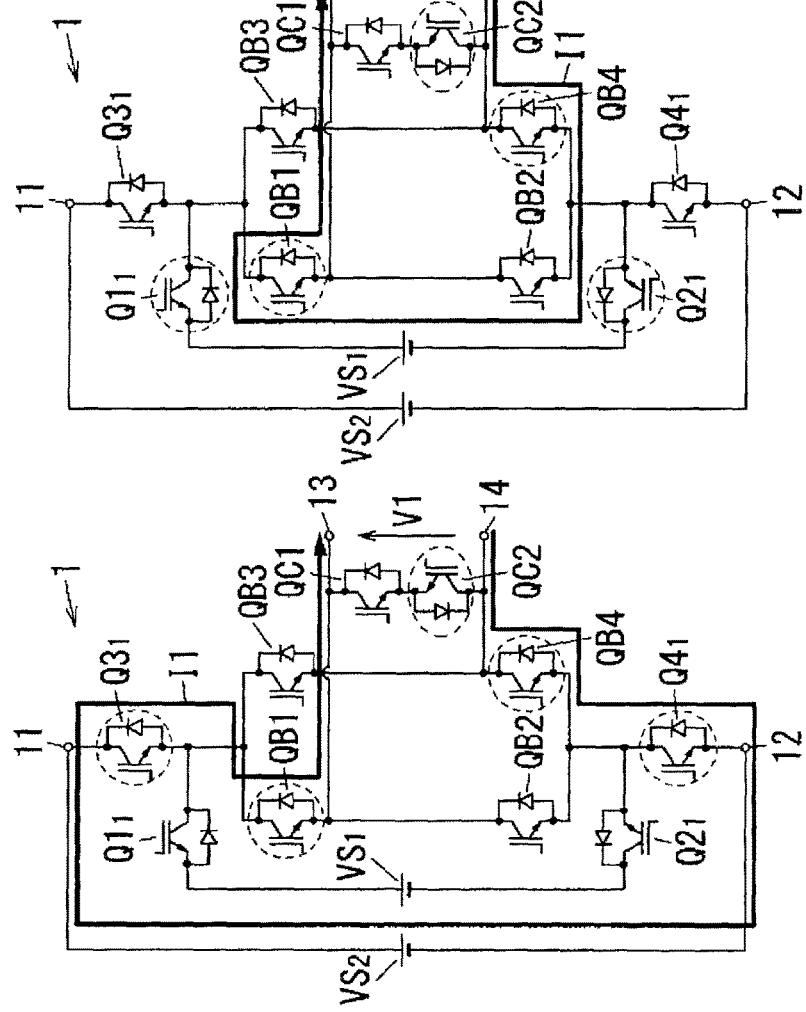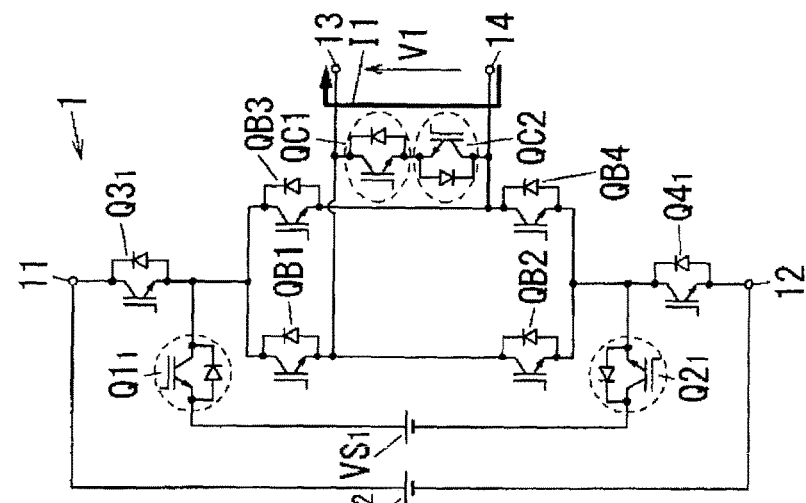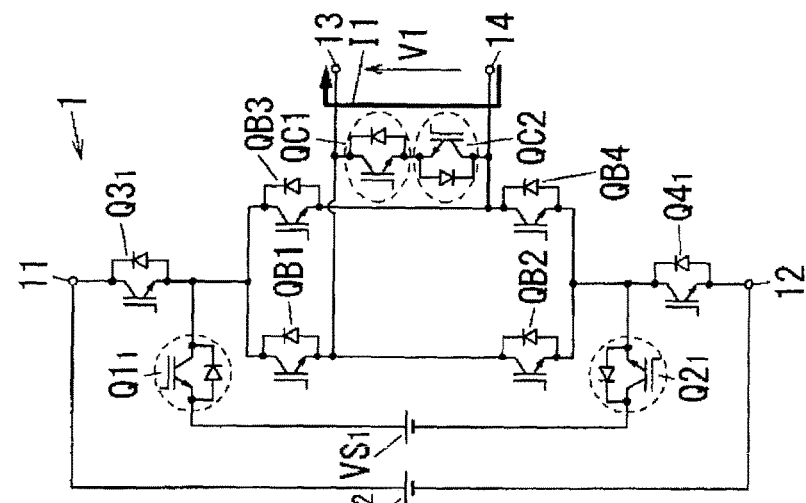

US 10,075,093 B2

POWER CONVERSION DEVICE FOR SUPPRESSING FLUCTUATION OF COMMON MODE VOLTAGE

TECHNICAL FIELD

The present invention relates generally to a power conversion device and, more particularly, to a power conversion device that converts DC power from a DC power source to AC power.

BACKGROUND ART

In recent years, as residential photovoltaic power generation devices, fuel cells, power storage devices and the like become widespread, various circuits have been proposed and provided as power conversion devices that convert the output of DC power sources to AC power. For example, Patent Document 1 (Japanese Unexamined Patent Application Publication No. 2014-64431) discloses a power conversion device (in Patent Document 1, a "multi-level power conversion device") that generates an AC output converted to a plurality of voltage levels (output levels) from a DC voltage source.

The power conversion device described in Patent Document 1 is a 5-level inverter that outputs voltages of 5 levels. The power conversion device includes two DC capacitors, two flying capacitors and sixteen switching elements. In this power conversion device, in a state in which a DC voltage E is applied to a series circuit of two DC capacitors, the respective switching elements are controlled so that the voltage across each DC capacitor becomes E/2 and the voltage across each flying capacitor becomes E/4, thereby outputting voltages of five levels.

However, in the above-described conventional example, a problem is posed in that the common mode (in-phase) voltage fluctuates when changing the output voltage. For this reason, in the above-described conventional example, there is a possibility that due to the fluctuation of the common mode voltage, a noise is generated or a leakage current flows.

SUMMARY OF THE INVENTION

In view of the above, it is an object of the present invention to provide a power conversion device capable of suppressing a fluctuation of a common mode voltage due to a transition of an output voltage.

In accordance with an aspect of the present invention, there is provided a power conversion device, including: a first input point and a second input point to which a main voltage source is electrically connected; a first output point and a second output point; N number of voltage control units to which voltage sources having mutually different power source voltages are electrically connected; a conversion unit provided with four switches and configured to invert the polarity of an input DC voltage to generate an output voltage at the first output point and the second output point; and a clamp unit provided with a holding switch and configured to hold the output voltage at a predetermined voltage, wherein the number N of the voltage control units is an integer of 1 or more, each of the N voltage control units includes a pair of regenerative switches configured to open and close an electrical path interconnecting the corresponding voltage source and the conversion unit and a pair of input switches configured to open and close an electrical path interconnecting the main voltage source and the conversion unit, and the power conversion device further comprises a control unit configured to switch the output voltage in 2N+3 steps by controlling the four switches of the conversion unit, the holding switch, the pair of regenerative switches and the pair of input switches of each of the N voltage control units.

Effects of the Invention

According to the present invention, it is possible to suppress a fluctuation of a common mode voltage due to a transition of an output voltage.

BRIEF DESCRIPTION OF THE DRAWINGS

FIGS. 13A to 13C are diagrams for explaining the operation of the power conversion device according to the first embodiment, which is composed of a 5-level inverter.

DETAILED DESCRIPTION OF THE PREFERRED EMBODIMENTS

First Embodiment

Figure 1A:
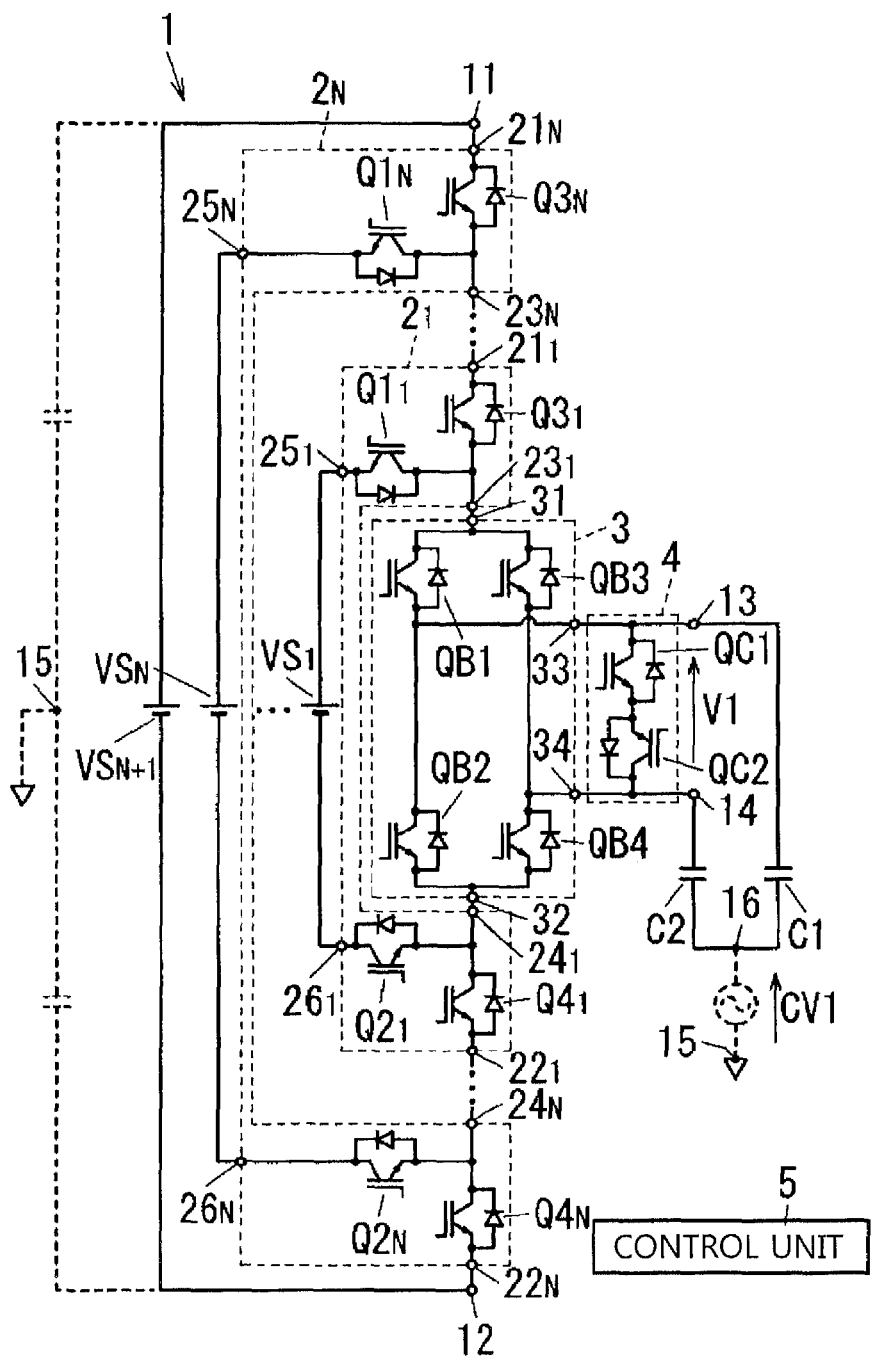
FIG. 1A is a circuit diagram showing a basic configuration of a power conversion device according to a first embodiment.
Figure 1B:
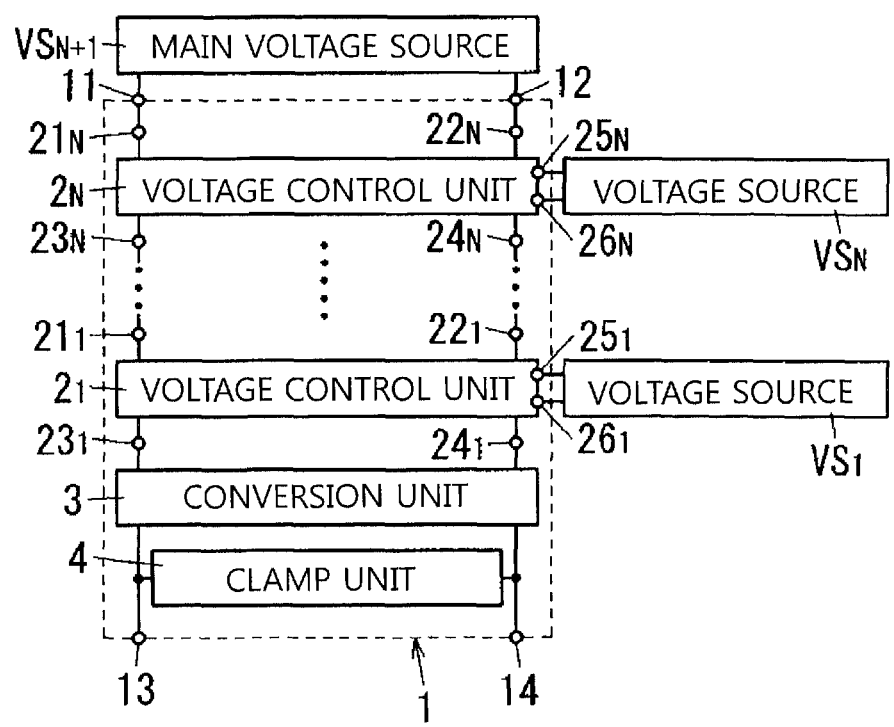
FIG. 1B is a block diagram showing the basic configuration of the power conversion device according to the first embodiment.

As shown in FIGS. 1A and 1B, the power conversion device 1 according to a first embodiment of the present invention includes a first input point 11 and a second input point 12, a first output point 13 and a second output point 14, N number of voltage control units $2_1$ to $2_N$, a conversion unit 3, a clamp unit 4, and a control unit 5. 'N' is an integer of 1 or more. A main voltage source $VS_{N+1}$ is electrically connected to the first input point 11 and the second input point 12. Voltage sources $VS_1$ to $VS_N$ having different power supply voltages $E_1$ to $E_N$ are electrically connected to the N voltage control units $2_1$ to $2_N$.

Each of the voltage control units $2_1$ to $2_N$ includes a pair of regenerative switches $Q1_1$ to $Q1_N$ and $Q2_1$ to $Q2_N$ and a pair of input switches $Q3_1$ to $Q3_N$ and $Q4_1$ to $Q4_N$. The regenerative switches $Q1_1$ to $Q1_N$ and $Q2_1$ to $Q2_N$ open and close an electrical path connecting the voltage source $VS_M$ and the conversion unit 3. The input switches $Q3_1$ to $Q3_N$ and $Q4_1$ to $Q4_N$ open and close an electric path connecting the main voltage source $VS_{N+1}$ and the conversion unit 3.

The conversion unit 3 includes four switches QB1 to QB4. The conversion unit 3 is a full-bridge type circuit that inverts the polarity of an inputted DC voltage to generate an output voltage V1 at the first output point 13 and the second output point 14 of the power conversion device. The clamp unit 4 includes holding switches QC1 and QC2 and holds the output voltage V1 at a predetermined voltage (in this example, 0 [V]).

The control unit 5 controls the four switches QB1 to QB4, the holding switches QC1 and QC2, and the regenerative switches $Q1_1$ to $Q1_N$ and $Q2_1$ to $Q2_N$ and the input switches $Q3_1$ to $Q3_N$ and $Q4_1$ to $Q4_N$ in each of the N voltage control units $2_1$ to $2_N$. As a result, the control unit 5 switches the output voltage V1 in '2N+3' steps.

Hereinafter, the power conversion device 1 of the present embodiment will be described in detail. However, the configuration to be described below is nothing more than an example of the present invention. The present invention is not limited to the following embodiments. In other embodiments, various modifications may be made depending on the design or the like without departing from the technical idea of the present invention.

First, the basic configuration of the power conversion device 1 of the present embodiment will be described. As described above, the power conversion device 1 of the present embodiment includes the N voltage control units $2_1$ to $2_N$, the conversion unit 3, the clamp unit 4 and the control unit 5 as shown in FIGS. 1A and 1B. The main voltage source $VS_{N+1}$ is electrically connected to the first input point 11 and the second input point 12 of the power conversion device 1. Moreover, for example, a system power source 7 (see FIG. 18) and a load 8 (see FIG. 18) are electrically connected to the first output point 13 and the second output point 14 of the power conversion device 1. The power conversion device 1 converts the DC voltage inputted from any one of the main voltage source $VS_{N+1}$ and the below-described voltage sources $VS_1$ to $VS_N$ to an AC voltage and outputs the AC voltage. In addition, the voltage sources $VS_1$ to $VS_N$ and the main voltage source $VS_{N+1}$ are different in power source voltages $E_1$ to $E_{N+1}$ from each other ($E_1 < \ldots < E_{N+1}$).

A series circuit of two capacitors C1 and C2 is electrically connected between the first output point 13 and the second output point 14 of the power conversion device. A connection point 16 of the capacitors C1 and C2 (namely, a common potential point of the first output point 13 and the second output point 14 of the power conversion device) is electrically connected to a housing (not shown) for accommodating the power conversion device 1 or a ground (not shown). The capacitors C1 and C2 may be either line bypass capacitors (Y capacitors) or parasitic capacitances.

In the following description, in each of the voltage sources $VS_1$ to $VS_N$ and the main voltage source $VS_{N+1}$, an intermediate potential point between a high potential point (positive electrode) and a low potential point (negative electrode) is set as a reference potential point 15. The reference potential point 15 is set as a reference potential E0 [V].

The voltage control units $2_1$ to $2_N$ are electrically connected in series between the main voltage source $VS_{N+1}$ and the conversion unit 3. Hereinafter, an arbitrary voltage control unit $2_M$ among the voltage control units $2_1$ to $2_N$ will be described. In this regard, 'M' is an integer between 1 and N inclusive. As described above, the voltage control unit $2_M$ includes a pair of regenerative switches $Q1_M$ and $Q2_M$ and a pair of input switches $Q3_M$ and $Q4_M$. In the power conversion device 1 of the present embodiment, the regenerative switches $Q1_M$ and $Q2_M$ and the input switches $Q3_M$ and $Q4_M$ are IGBTs (Insulated Gate Bipolar Transistors). Recovery diodes are built in the regenerative switches $Q1_M$ and $Q2_M$ and the input switches $Q3_M$ and $Q4_M$. The regenerative switches $Q1_M$ and $Q2_M$ and the input switches $Q3_M$ and $Q4_M$ may be composed of other semiconductor switching elements such as a bipolar transistor and a MOSFET (Metal-Oxide-Semiconductor Field-Effect Transistor).

The collector of the input switch $Q3_M$ is electrically connected to the first input point $21_M$, and the emitter thereof is electrically connected to the first output point $23_M$. Furthermore, the emitter of the input switch $Q4_M$ is electrically connected to the second input point $22_M$, and the collector thereof is electrically connected to the second output point $24_M$. The first input point $21_M$ is electrically connected to the high potential point (positive electrode) of the main voltage source $VS_{N+1}$ via the first input point 11 of the power conversion device (in the case of M=N), or is electrically connected to the first output point $23_{M+1}$ of the voltage control unit $2_{M+1}$ (in the case of M≠N). The second input point $22_M$ is electrically connected to the low potential point (negative electrode) of the main voltage source $VS_{N+1}$ via the second input point 12 of the power conversion device (in the case of M=N), or is electrically connected to the second output point $24_{M+1}$ of the voltage control unit $2_{M+1}$ (in the case of M≠N).

The input switches $Q3_M$ and $Q4_M$ are switched on and off by the control unit 5 so as to open and close a part of the electrical path between the first input point 11 of the power conversion device and the first input point 31 of the conversion unit 3 and a part of the electrical path between the second input point 12 of the power conversion device and the second input point 32 of the conversion unit 3. That is to say, the input switches $Q3_M$ and $Q4_M$ open and close the electrical path connecting the main voltage source $VS_{N+1}$ and the conversion unit 3.

The emitter of the regenerative switch $Q1_M$ is electrically connected to the third input point $25_M$, and the collector thereof is electrically connected to the first output point $23_M$. Furthermore, the collector of the regenerative switch $Q2_M$ is electrically connected to the fourth input point $26_M$, and the emitter thereof is electrically connected to the second output point $24_M$. The third input point $25_M$ is electrically connected to the high potential point (positive electrode) of the voltage source $VS_M$. The fourth input point $26_M$ is electrically connected to the low potential point (negative electrode) of the voltage source $VS_M$.

The regenerative switches $Q1_M$ and $Q2_M$ are switched on and off by the control unit 5 so as to open and close a part of the electrical path between the third input point $25_M$ and the first input point 31 of the conversion unit 3 and a part of the electrical path between the fourth input point $26_M$ and the second input point 32 of the conversion unit 3. In other words, the regenerative switches $Q1_M$ and $Q2_M$ open and close the electrical path connecting the voltage source $VS_M$ and the conversion unit 3.

The conversion unit 3 is a full-bridge inverter including four switches QB1 to QB4. In the DC/DC converter 1 of the present embodiment, each of the switches QB1 to QB4 is an IGBT. In addition, a recovery diode is built in each of the switches QB1 to QB4. The switches QB1 to QB4 may be composed of other semiconductor switching elements such as bipolar transistors and MOSFETs.

In the conversion unit 3, a series circuit of the first switch QB1 and the second switch QB2 and a series circuit of the third switch QB3 and the fourth switch QB4 are electrically connected in parallel. The collectors of the switches QB1 and QB3 are electrically connected to the first input point 31 of the conversion unit 3. The first input point 31 of the conversion unit 3 is electrically connected to the first input point 11 of the power conversion device via the voltage control units $2_1$ to $2_N$. The emitters of the switches QB2 and QB4 are electrically connected to the second input point 32 of the conversion unit 3. The second input point 32 of the conversion unit 3 is electrically connected to the second input point 12 of the power conversion device via the voltage control units $2_1$ to $2_N$. A connection point between the emitter of the first switch QB1 and the collector of the second switch QB2 and a connection point between the emitter of the third switch QB3 and the collector of the fourth switch QB4 become a pair of output points 33 and 34 of the conversion unit 3.

The clamp unit 4 includes a series circuit of a first holding switch QC1 and a second holding switch QC2. In the power conversion device 1 of the present embodiment, each of the holding switches QC1 and QC2 is an IGBT. Furthermore, a recovery diode is built in each of the holding switches QC1 and QC2. The holding switches QC1 and QC2 may be composed of other semiconductor switching elements such as bipolar transistors and MOSFETs.

The collector of the first holding switch QC1 is electrically connected to the first output point 33 of the conversion unit 3 and is electrically connected to the first output point 13 of the power conversion device. The collector of the second holding switch QC2 is electrically connected to the second output point 34 of the conversion unit 3 and is electrically connected to the second output point 14 of the power conversion device. Furthermore, the emitter of the first holding switch QC1 and the emitter of the second holding switch QC2 are electrically connected to each other. The clamp unit 4 holds the output voltage V1 at a predetermined voltage (in this example, 0 [V]) using the holding switches QC1 and QC2.

The control unit 5 mainly includes, for example, a microcomputer and executes various processes by executing a program stored in a memory (not shown). The program may be provided through an electric communication line or may be provided in a state in which the program is stored in a storage medium. The control unit 5 applies a drive signal to each of the regenerative switches $Q1_1$ to $Q1_N$ and $Q2_1$ to $Q2_N$ and the input switches $Q3_1$ to $Q3_N$ and $Q4_1$ to $Q4_N$ of the voltage control units $2_1$ to $2_N$ to switch the on/off states thereof, thereby controlling the voltage control units $2_1$ to $2_N$. Furthermore, the control unit 5 applies a drive signal to each of the switches QB1 to QB4 of the conversion unit 3 to switch the on/off states thereof, thereby controlling the conversion unit 3. Moreover, the control unit 5 applies a drive signal to each of the holding switches QC1 and QC2 of the clamp unit 4 to switch the on/off states thereof, thereby controlling the clamp unit 4. These drive signals are PWM (Pulse Width Modulation) signals.

Hereinafter, the operation of the basic configuration of the power conversion device 1 of the present embodiment will be described. In this basic configuration, the control unit 5 controls the respective switches of the N voltage control units $2_1$ to $2_N$, the conversion unit 3 and the clamp unit 4 according to the conditions shown in the following Table 1. That is to say, the control unit 5 controls the four switches QB1 to QB4, the holding switches QC1 and QC2, and the regenerative switches $Q1_1$ to $Q1_N$ and $Q2_1$ to $Q2_N$ and the input switches $Q3_1$ to $Q3_N$ and $Q4_1$ to $Q4_N$ in the N voltage control units $2_1$ to $2_N$. As a result, this basic configuration operates as a multi-level inverter that switches the output voltage V1 in '2N+3' steps. That is to say, assuming that the power source voltages of the voltage sources $VS_1$ to $VS_N$ are $E_1$ to $E_N$ [V] and the power source voltage of the main voltage source $VS_{N+1}$ is $E_{N+1}$, this basic configuration generates an output voltage V1 of any one of 0 [V], $\pm E_1$ [V], ... and $\pm E_{N+1}$ [V]. By appropriately switching the output voltage V1 with the control unit 5, this basic configuration outputs an AC voltage which varies between $-E_{N+1}$ [V] and $E_{N+1}$ [V] around 0 [V].

TABLE 1

| | | |
|---|---|---|
| $Q1_1, Q2_1$ | $|V1| = E_1$ (V) | ON |
| | Other than the above | OFF |
| $Q1_M, Q2_M$ | $|V1| = E_M$ (V) | ON |
| | Other than the above | OFF |
| $Q1_N, Q2_N$ | $|V1| = E_N$ (V) | ON |
| | Other than the above | OFF |
| $Q3_1, Q4_1$ | $|V1| \geq E_1$ (V) | ON |
| | Other than the above | OFF |
| $Q3_M, Q4_M$ | $|V1| \geq E_{M+1}$ (V) | ON |
| | Other than the above | OFF |
| $Q3_N, Q4_N$ | $|V1| = E_{N+1}$ (V) | ON |
| | Other than the above | OFF |
| QB1, QB4 | V1 > 0 (V) | ON |
| | Other than the above | OFF |
| QB2, QB3 | V1 < 0 (V) | ON |
| | Other than the above | OFF |
| QC1, QC2 | V1 = 0 (V) | ON |
| | Other than the above | OFF |

For example, when generating the output voltage V1 of $E_M$ [V], the control unit 5 switches on the regenerative switches $Q1_M$ and $Q2_M$ of the voltage control unit $2_M$ and switches off the regenerative switches of the remaining voltage control units $2_1$ to $2_{M-1}$ and $2_{M+1}$ to $2_N$. Further, the control unit 5 switches on the input switches $Q3_1$ to $Q3_{M-1}$ and $Q4_1$ to $Q4_{M-1}$ of the voltage control units $2_1$ to $2_{M-1}$ and switches off the input switches of the remaining voltage control units $2_M$ to $2_N$. Then, the control unit 5 switches on the switches QB1 and QB4 of the conversion unit 3, switches off the switches QB2 and QB3, and switches off the holding switches QC1 and QC2 of the clamp unit 4.

Further, when generating the output voltage V1 of $-E_M$ [V], the control unit 5 may switch off the switches QB1 and QB4 of the conversion unit 3 and may switch on the switches QB2 and QB3 in the aforementioned state. Moreover, when the output voltage V1 is 0 [V], the control unit 5 may switch off all the switches of the voltage control units $2_1$ to $2_N$ and the conversion unit 3 and may switch on the holding switches QC1 and QC2 of the clamp unit 4.

Figure 2:
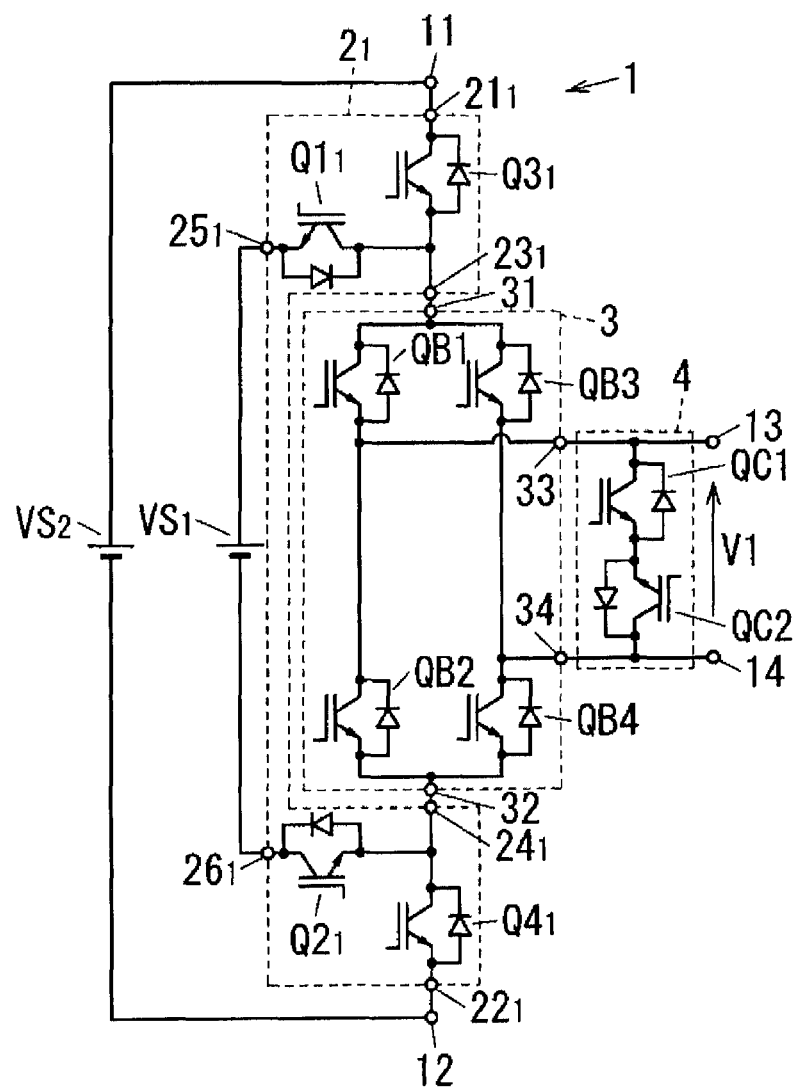
FIG. 2 is a circuit diagram of the power conversion device according to the first embodiment, which is composed of a 5-level inverter.

Hereinafter, as an example, description will be made on the power conversion device 1 including a multi-level inverter (hereinafter referred to as "5-level inverter") which switches the output voltage V1 in 5 steps (namely, N=1). As shown in FIG. 2, the power conversion device 1 includes one voltage control unit $2_1$. A voltage source $VS_1$ is electrically connected to the third input point $25_1$ and the fourth input point $26_1$ of the voltage control unit $2_1$. In addition, a main voltage source $VS_2$ is electrically connected to the first input point 11 and the second input point 12 of the power conversion device. In this regard, it is assumed that the power source voltage of the voltage source $VS_1$ is 1 [V] and the power source voltage of the main voltage source $VS_2$ is 2 [V].

In the power conversion device 1, the control unit 5 controls the respective switches of the voltage control unit $2_1$, the conversion unit 3 and the clamp unit 4 according to the condition shown in the following Table 2, thereby generating the output voltage V1 in five steps of ±2 [V], ±1 [V] and 0 [V]. The common-mode (in-phase) voltage CV1 in Table 2 will be described later.

TABLE 2

| V1 [V] | $Q1_1, Q2_1$ | $Q3_1, Q4_1$ | QB1, QB4 | QB2, QB3 | QC1, QC2 | CV1 [V] |
|---|---|---|---|---|---|---|
| 2 | OFF | ON | ON | OFF | OFF | 0 |
| 1 | ON | OFF | ON | OFF | OFF | 0 |
| 0 | OFF | OFF | OFF | OFF | ON | 0 |
| −1 | ON | OFF | OFF | ON | OFF | 0 |
| −2 | OFF | ON | OFF | ON | OFF | 0 |

Figure 3A:
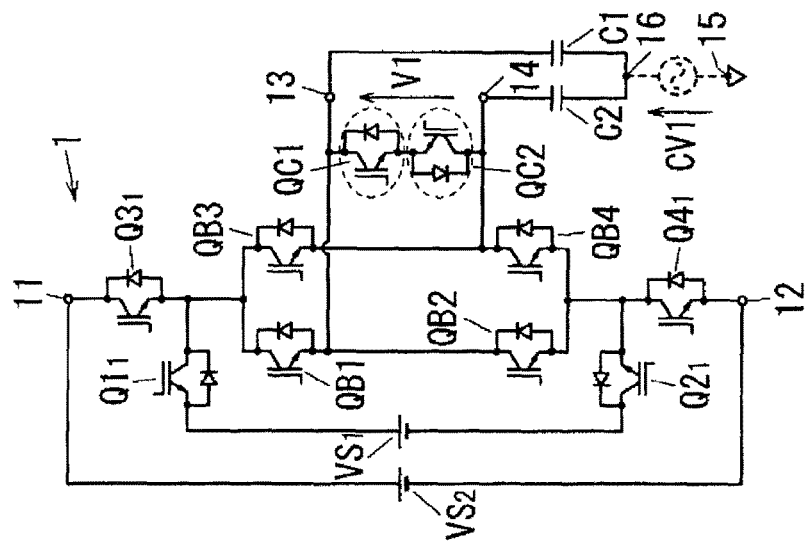
FIGS. 3A to 3C are diagrams for explaining the operation of the power conversion device according to the first embodiment, which is composed of a 5-level inverter.
Figure 3B:
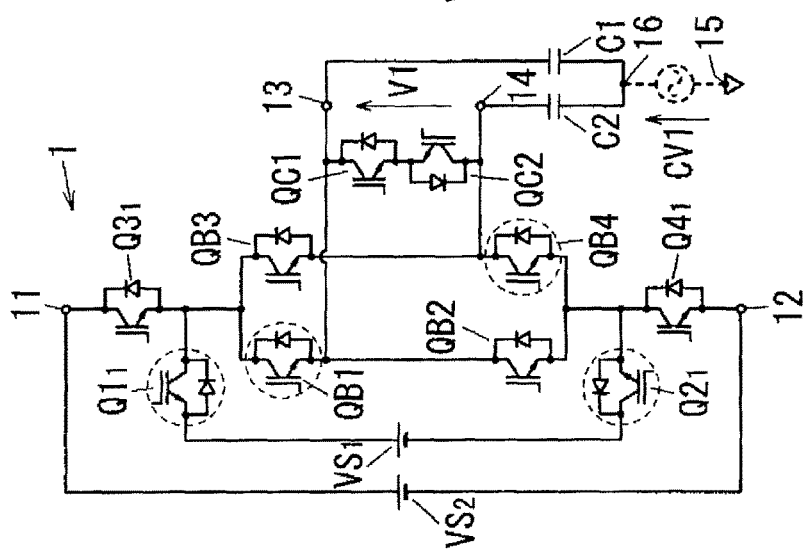
Figure 3C:
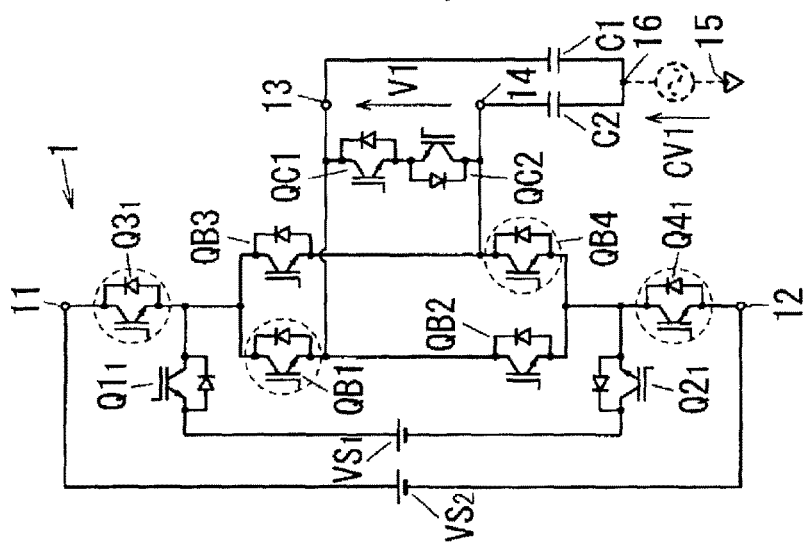

Hereinafter, concrete description will be made with reference to FIGS. 3A to 3C. In FIGS. 3A to 3C, the switch surrounded by a circle is in an on state, and the switch not surrounded by a circle is in an off state. For example, when generating the output voltage V1 of 2 [V], as shown in FIG. 3A, the control unit 5 switches on the input switches $Q3_1$ and $Q4_1$ of the voltage control unit $2_1$ and the switches QB1 and QB4 of the conversion unit 3, and switches off the other switches. In the case of generating the output voltage V1 of −2 [V], the control unit 5 switches off the switches QB1 and QB4 of the converting unit 3 and switches on the switches QB2 and QB3 in the aforementioned state.

When generating the output voltage V1 of 1 [V], as shown in FIG. 3B, the control unit 5 switches on the regenerative switches $Q1_1$ and $Q2_1$ of the voltage control unit $2_1$ and the switches QB1 and QB4 of the conversion unit and switches off the other switches. In the case of generating the output voltage V1 of −1 [V], the control unit 5 switches off the switches QB1 and QB4 of the conversion unit 3 and switches on the switches QB2 and QB3 in the aforementioned state.

Figure 4:
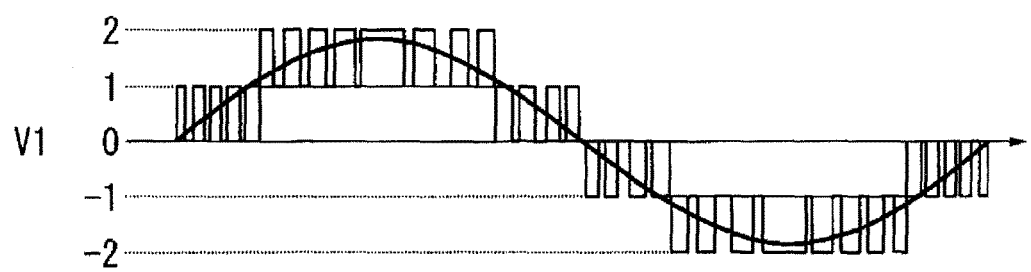
FIG. 4 is an output waveform diagram of the power conversion device according to the first embodiment, which is composed of a 5-level inverter.

Further, when the output voltage V1 is 0 [V], as shown in FIG. 3C, the control unit 5 switches on the holding switches QC1 and QC2 of the clamp unit 4 and switches off the other switches. By appropriately switching the output voltage V1 with the control unit 5, as shown in FIG. 4, the power conversion device 1 outputs an AC voltage which varies between −2 [V] and 2 [V] around 0 [V] (See the thick solid line in FIG. 4).

Description will now be made on the voltage between the connection point 16 of the capacitors C1 and C2 and the reference potential point 15 (namely, the common-mode (in-phase) voltage CV1 on the output side). For example, when the output voltage V1 is 2 [V], the potential of the first output point 13 of the power conversion device becomes 'E0+1' [V], and the potential of the second output point 14 of the power conversion device becomes 'E0−1' [V]. Therefore, the potential of the connection point 16 of the capacitors C1 and C2 becomes E0 [V] which is an intermediate potential between the potential of the first output point 13 of the power conversion device and the potential of the second output point 14 of the power conversion device. That is to say, the common-mode voltage CV1 is 0 [V].

Moreover, for example, when the output voltage V1 is −1 [V], the potential of the first output point 13 of the power conversion device becomes 'E0−½' [V], and the potential of the second output point 14 of the power conversion device becomes 'E0+½' [V]. Accordingly, the potential of the connection point 16 of the capacitors C1 and C2 becomes E0 [V] which is an intermediate potential between the potential of the first output point 13 of the power conversion device and the potential of the second output point 14 of the power conversion device. That is to say, the common-mode voltage CV1 is 0 [V].

As described above, in the power conversion device 1 of the present embodiment, the common-mode voltage CV1 becomes 0 [V] regardless of the level of the output voltage V1 as shown in Table 2.

Of course, the power conversion device 1 of the present embodiment is not limited to the aforementioned 5-level inverter and may be composed of a multi-level inverter that switches the output voltage V1 in more steps. For example, the power conversion device 1 of the present embodiment may be composed of a multi-level inverter (hereinafter referred to as "7-level inverter") which switches the output voltage V1 in seven steps (namely, N=2).

Figure 5:
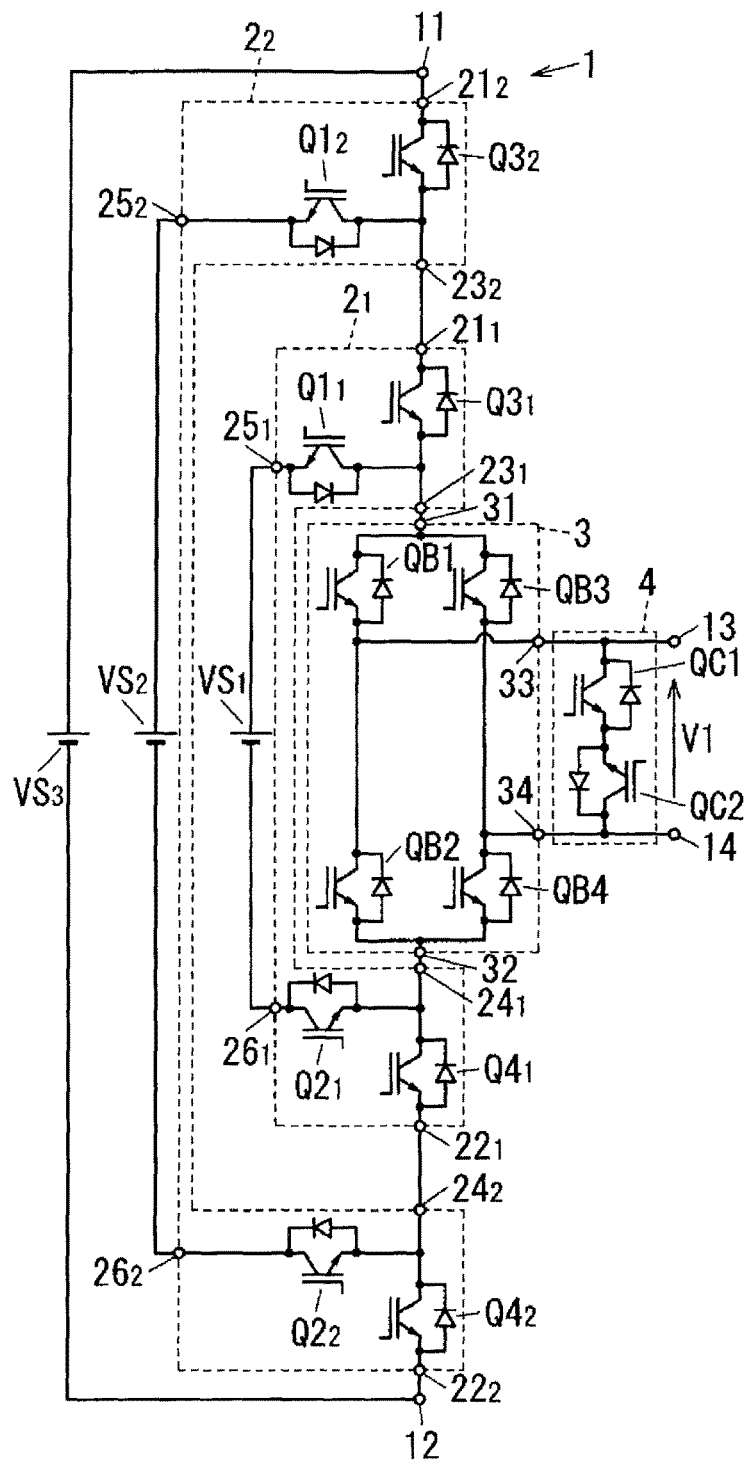
FIG. 5 is a circuit diagram of the power conversion device according to the first embodiment, which is composed of a 7-level inverter.

As shown in FIG. 5, the power conversion device 1 composed of a 7-level inverter includes two voltage control units $2_1$ and $2_2$. A voltage source $VS_1$ is electrically connected to the third input point $25_1$ and the fourth input point $26_1$ of the voltage control unit $2_1$. A voltage source $VS_2$ is electrically connected to the third input point $25_2$ and the fourth input point $26_2$ of the voltage control unit $2_2$. In addition, a main voltage source $VS_3$ is electrically connected to the first input point 11 and the second input point 12 of the power conversion device. In this regard, it is assumed that the power source voltage of the voltage source $VS_1$ is 1 [V], the power source voltage of the voltage source $VS_2$ is 2 [V], and the power source voltage of the main voltage source $VS_3$ is 3 [V].

In the power conversion device 1, the control unit 5 controls the respective switches of the voltage control units $2_1$ and $2_2$, the conversion unit 3 and the clamp unit 4 according to the conditions shown in the following Table 3, thereby generating the output voltage V1 in seven steps of ±3 [V], ±2 [V], ±1 [V] and 0 [V].

TABLE 3

| V1 [V] | $Q1_1$, $Q2_1$ | $Q3_1$, $Q4_1$ | $Q1_2$, $Q2_2$ | $Q3_2$, $Q4_2$ | QB1, QB4 | QB2, QB3 | QC1, QC2 |
|---|---|---|---|---|---|---|---|
| 3  | OFF | ON  | OFF | ON  | ON  | OFF | OFF |
| 2  | OFF | ON  | ON  | OFF | ON  | OFF | OFF |
| 1  | ON  | OFF | OFF | OFF | ON  | OFF | OFF |
| 0  | OFF | OFF | OFF | OFF | OFF | OFF | ON  |
| −1 | ON  | OFF | OFF | OFF | OFF | ON  | OFF |
| −2 | OFF | ON  | ON  | OFF | OFF | ON  | OFF |
| −3 | OFF | ON  | OFF | ON  | OFF | ON  | OFF |

Figure 6A:
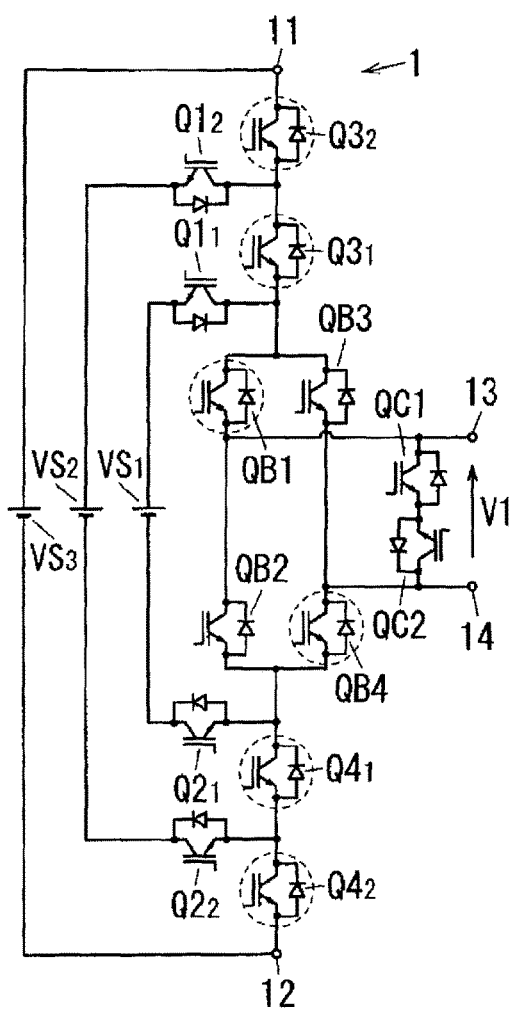
FIGS. 6A and 6B are diagrams for explaining the operation of the power conversion device according to the first embodiment, which is composed of a 7-level inverter.

Hereinafter, specific description will be made with reference to FIGS. 6A, 6B, 7A and 7B. In FIGS. 6A, 6B, 7A and 7B, the switch surrounded by a circle is in an on state, and the switch not surrounded by a circle is in an off state. For example, when generating an output voltage V1 of 3 [V], as shown in FIG. 6A, the control unit 5 switches on the input switches $Q3_1$, $Q3_2$, $Q4_1$ and $Q4_2$ of the voltage control units $2_1$ and $2_2$ and the switches QB1 and QB4 of the conversion unit 3, and switches off the other switches. In the case of generating an output voltage V1 of −3 [V], the control unit 5 switches off the switches QB1 and QB4 of the conversion unit 3 and switches on the switches QB2 and QB3 in the aforementioned state.

Figure 6B:
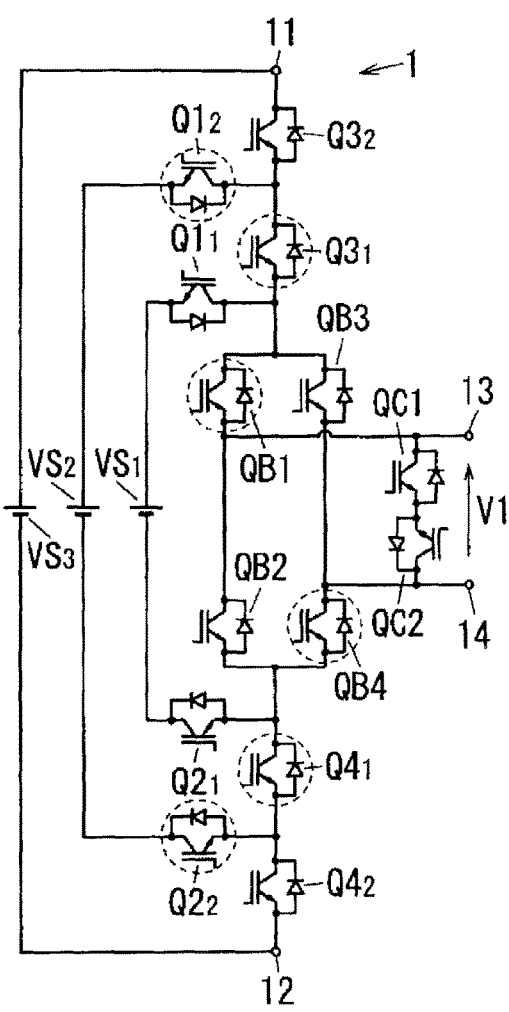

When generating an output voltage V1 of 2 [V], as shown in FIG. 6B, the control unit 5 switches on the regenerative switches $Q1_2$ and $Q2_2$ of the voltage control unit $2_2$ and the input switches $Q3_1$ and $Q4_1$ of the voltage control unit $2_1$. Further, the control unit 5 switches on the switches QB1 and QB4 of the conversion unit 3, and switches off the other switches. In the case of generating an output voltage V1 of −2 [V], the control unit 5 switches off the switches QB1 and QB4 of the conversion unit 3 and switches on the switches QB2 and QB3 in the aforementioned state.

Figure 7A:
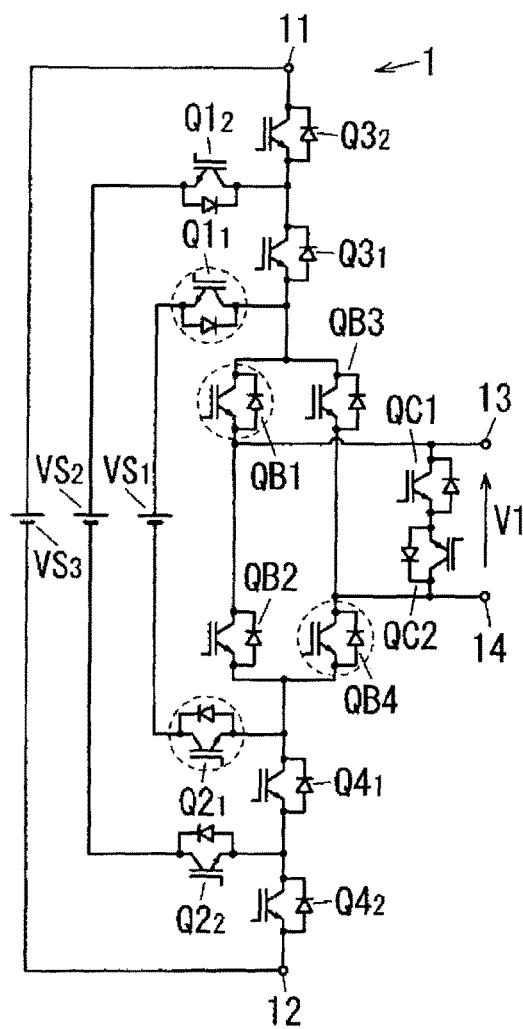
FIGS. 7A and 7B are diagrams for explaining the operation of the power conversion device according to the first embodiment, which is composed of a 7-level inverter.

When generating an output voltage V1 of 1 [V], as shown in FIG. 7A, the control unit 5 switches on the regenerative switches $Q1_1$ and $Q2_1$ of the voltage control unit $2_1$ and the switches QB1 and QB4 of the conversion unit 3, and switches off the other switches. In the case of generating an output voltage V1 of −1 [V], the control unit 5 switches off the switches QB1 and QB4 of the conversion unit 3 and switches on the switches QB2 and QB3 in the aforementioned state.

Figure 7B:
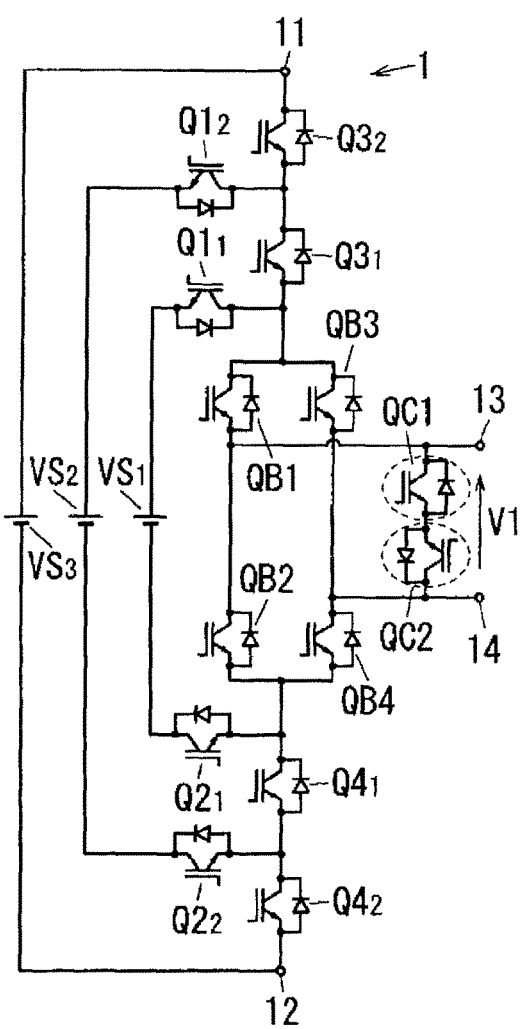

Further, when the output voltage V1 is 0 [V], as shown in FIG. 7B, the control unit 5 switches on the holding switches QC1 and QC2 of the clamp unit 4 and switches off the other switches. By suitably switching the output voltage V1 with the control unit 5, the power conversion device 1 outputs an AC voltage which varies between −3 [V] and 3 [V] around 0 [V].

In this power conversion device 1, as in the case of the power conversion device composed of the 5-level inverter, the common-mode voltage CV1 becomes 0 [V] regardless of the level of the output voltage V1.

Figure 8:
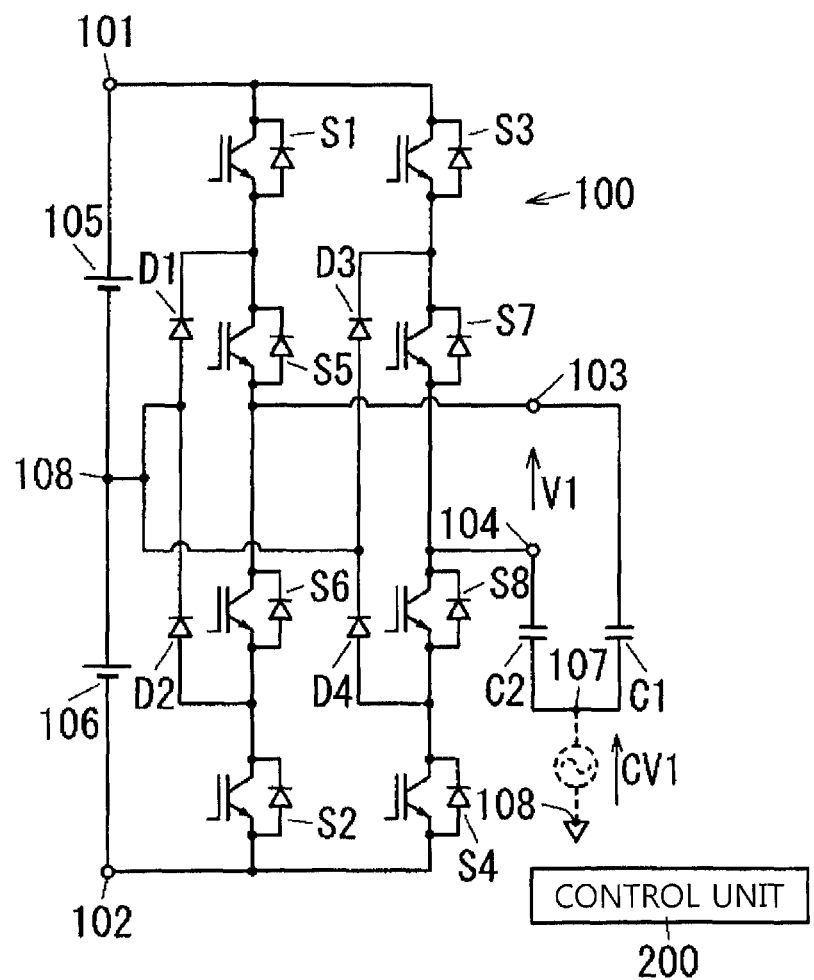
FIG. 8 is a circuit diagram showing a power conversion device according to a comparative example, which is composed of a 5-level inverter.

Now, a power conversion device 100, which is an NPC (Neutral-Point-Clamped) type five-level inverter, will be described as a comparative example of the power conversion device 1 of the present embodiment. In this power conversion device 100, as shown in FIG. 8, two voltage sources 105 and 106 are electrically connected in series between a first input point 101 and a second input point 102. In this regard, it is assumed that the power supply voltages of the voltage sources 105 and 106 are all 1 [V].

Similar to the power conversion device 1 of the present embodiment, a series circuit of two capacitors C1 and C2 is electrically connected between the first output point 103 and the second output point 104. A connection point 107 of the capacitors C1 and C2 (namely, a common potential point between the first output point 103 and the second output point 104) is electrically connected to a housing (not shown) for accommodating the power conversion device 100 or a ground (not shown). The connection point between the low potential point (negative electrode) of the voltage source 105 and the high potential point (positive electrode) of the voltage source 106 is a reference potential point 108. The potential of the reference potential point 108 is E0 [V] as in the power conversion device 1 of the present embodiment.

A series circuit of the switches S1 and S5 is electrically connected between the first input point 101 and the first output point 103. A series circuit of the switches S2 and S6 is electrically connected between the second input point 102 and the first output point 103. A series circuit of the switches S3 and S7 is electrically connected between the first input point 101 and the second output point 104. Furthermore, a series circuit of the switches S4 and S8 is electrically connected between the second input point 102 and the second output point 104. Each of the switches S1 to S8 is an IGBT. A recovery diode is built in each of the switches S1 to S8.

The collectors of the switches S1 and S3 are electrically connected to the first input point 101, and the emitters of the switches S2 and S4 are electrically connected to the second input point 102. The emitter of the switch S5 and the collector of the switch S6 are electrically connected to the first output point 103, and the emitter of the switch S7 and the collector of the switch S8 are electrically connected to the second output point 104.

A series circuit of diodes D1 and D2 is electrically connected between the connection point of the emitter of the switch S1 and the collector of the switch S5 and the connection point of the collector of the switch S2 and the emitter of the switch S6. The connection point of the anode of the diode D1 and the cathode of the diode D2 is electrically connected to the reference potential point 108. A series circuit of diodes D3 and D4 is electrically connected between the connection point of the emitter of the switch S3 and the collector of the switch S7 and the connection point of the collector of the switch S4 and the emitter of the switch S8. The connection point of the anode of the diode D3 and the cathode of the diode D4 is electrically connected to the reference potential point 108.

The switches S1 to S8 are switched on and off by being supplied with a drive signal, which is a PWM signal, from a control unit 200. In the power conversion device 100, the control unit 200 controls the switches S1 to S8 according to the conditions shown in the following Table 4, thereby generating an output voltage V1 in five steps of ±2 [V], ±1 [V] and 0 [V].

TABLE 4

| V1 [V] | S1 | S2 | S3 | S4 | S5, S8 | S6, S7 | CV1 [V] |
|---|---|---|---|---|---|---|---|
| 2 | ON | OFF | OFF | ON | ON | OFF | 0 |
| 1 | ON | OFF | OFF | OFF | ON | OFF | ½ |
| 0 | OFF | OFF | OFF | OFF | ON | OFF | 0 |
| −1 | OFF | ON | OFF | OFF | OFF | ON | −½ |
| −2 | OFF | ON | ON | OFF | OFF | ON | 0 |

Figure 9:
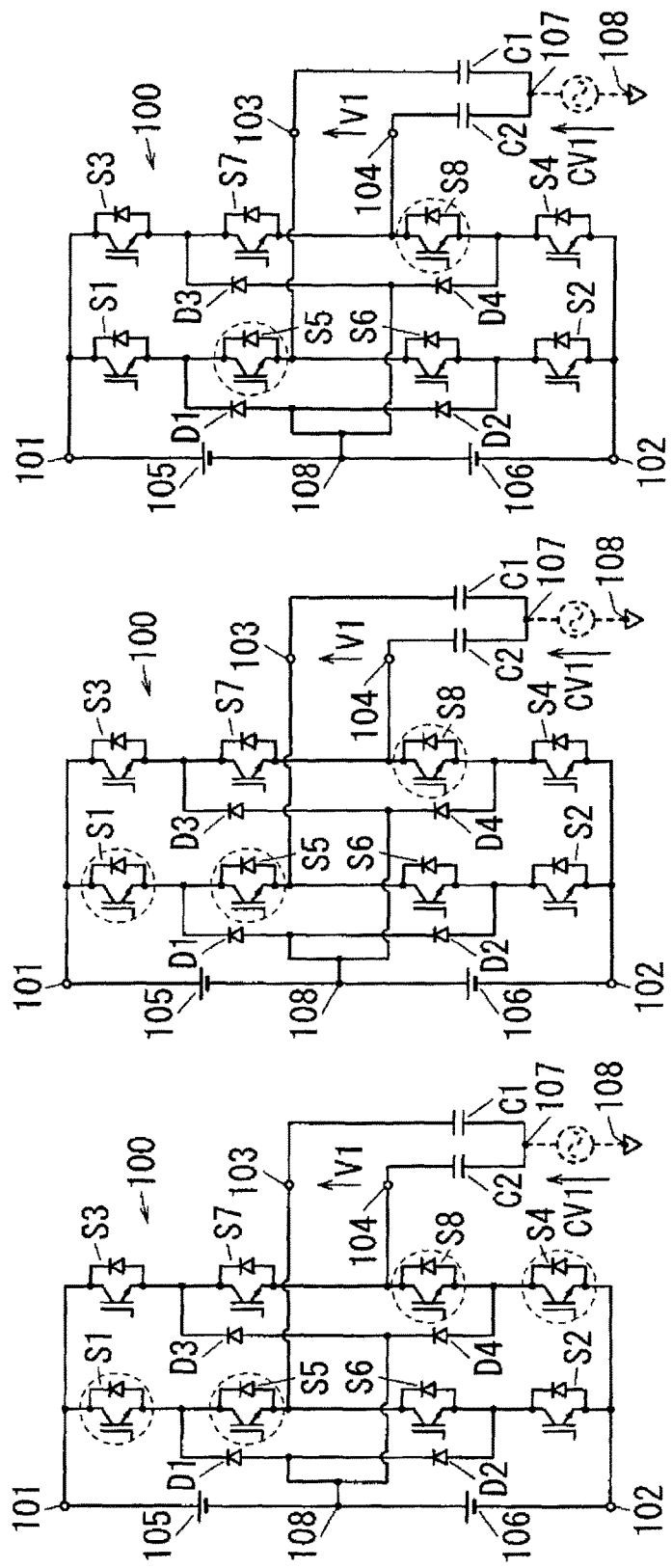
FIGS. 9A to 9C are diagrams for explaining the operation of the power conversion device according to the comparative example, which is composed of a 5-level inverter.

Hereinafter, specific description will be made with reference to FIGS. 9A to 9C. In FIGS. 9A to 9C, the switch surrounded by a circle is in an on state, and the switch not surrounded by a circle is in an off state. For example, when generating an output voltage V1 of 2 [V], as shown in FIG. 9A, the control unit 200 switches on the switches S1, S4, S5 and S8 and switches off the other switches. In the case of generating an output voltage V1 of −2 [V], the control unit 200 switches on the switches S2, S3, S6 and S7 and switches off the other switches.

In the case of generating an output voltage V1 of 1 [V], as shown in FIG. 9B, the control unit 200 switches on the switches S1, S5 and S8 and switches off the other switches. In the case of generating an output voltage V1 of −1 [V], the control unit 200 switches on the switches S2, S6 and S7 and switches off the other switches.

Furthermore, when the output voltage V1 is 0 [V], the control unit 200 switches on the switches S5 and S8 and switches off other switches as shown in FIG. 9C. By suitably switching the output voltage V1 with the control unit 200, the power conversion device 100 outputs an AC voltage which varies between −2 [V] and 2 [V] around 0 [V].

Description will now be made on the voltage between the connection point 107 of the capacitors C1 and C2 and the reference potential point 108 (namely, the common-mode voltage CV1 on the output side). For example, when the output voltage V1 is 2 [V], the potential of the first output point 103 is 'E0+1' [V] and the potential of the second output point 104 is 'E0−1' [V]. Accordingly, the potential of the connection point 107 of the capacitors C1 and C2 is E0 [V] which is an intermediate potential between the potential of the first output point 103 and the potential of the second output point 104. That is to say, the common-mode voltage CV1 is 0 [V].

Furthermore, for example, when the output voltage is 0 [V], both the potential of the first output point 103 and the potential of the second output point 104 are E0 [V]. Therefore, the potential of the connection point 107 of the capacitors C1 and C2 becomes E0 [V] which is an intermediate potential between the potential of the first output point 103 and the potential of the second output point 104. That is to say, the common-mode voltage CV1 is 0 [V].

On the other hand, for example, when the output voltage V1 is 1 [V], the potential of the first output point 103 is 'E0+1' [V] and the potential of the second output point 104 is E0 [V]. Therefore, the potential of the connection point 107 of the capacitors C1 and C2 becomes 'E0+½' [V] which is an intermediate potential between the potential of the first output point 13 of the power conversion device and the potential of the second output point 14 of the power conversion device. That is to say, the common-mode voltage CV1 is ½ [V]. As shown in Table 4, when the output voltage V1 is −1 [V], the common-mode voltage CV1 is −½ [V].

As described above, in the power conversion device 100 of the comparative example, the common-mode voltage CV1 fluctuates as the output voltage V1 varies. In the power conversion device 100, there is a possibility that a noise is generated or a leakage current flows due to fluctuation of the common-mode voltage CV1.

As described above, in the power conversion device 100 of the comparative example, the common-mode voltage CV1 fluctuates when the output voltage V1 is ±1 [V]. Therefore, in the power conversion device 100, by using a 3-level inverter that switches the output voltage V1 in three steps of 0 [V] and ±2 [V], it is possible to avoid the fluctuation of the common-mode voltage CV1. However, in this case, in order to realize a desired multi-level inverter, it is necessary to use a multi-level inverter capable of switching the output voltage V1 in multiple steps. For example, in order to realize a 5-level inverter on the condition that the fluctuation of the common-mode voltage CV1 is avoided, it is necessary to form the power conversion device 100 of the comparative example as a 7-level inverter. As described above, in the power conversion device 100 of the comparative example, if it is attempted to avoid the fluctuation of the common-mode voltage CV1, there arises a problem that the number of elements constituting the circuit increases.

Thus, in the power conversion device 1 of the present embodiment, the control unit 5 controls the regenerative switches $Q1_1$ to $Q1_N$ and $Q2_1$ to $Q2_N$ and the input switches $Q3_1$ to $Q3_N$ and $Q4_1$ to $Q4_N$ of the N voltage control units $21$ to $2_N$, thereby changing the DC voltage inputted to the conversion unit 3. In the power conversion device 1 of the present embodiment, the control unit 5 controls the switches QB1 to QB4 of the conversion unit 3, thereby inverting the polarity of the output voltage V1. Furthermore, in the power conversion device 1 of the present embodiment, the control unit 5 controls the holding switches QC1 and QC2 of the clamp unit 4, thereby holding the output voltage V1 at a predetermined voltage (in this example, 0 [V]).

Therefore, in the power conversion device 1 of the present embodiment, even if the output voltage V1 is changed, the intermediate potential between the potential of the first output point 13 of the power conversion device and the potential of the second output point 14 of the power conversion device does not fluctuate. Thus, the common-mode voltage CV1 does not fluctuate. That is to say, the power conversion device 1 of the present embodiment can suppress the fluctuation of the common-mode voltage CV1 due to the transition of the output voltage V1. Accordingly, in the power conversion device 1 of the present embodiment, there is an advantage that a noise attributable to the fluctuation of the common-mode voltage CV1 is hard to occur and a leakage current hardly flows.

Further, the power conversion device 1 of the present embodiment also has the following advantages. The results of comparing the number of constituent elements (the switches, the diodes (including the recovery diodes) and the voltage source) of the power conversion device 1 of the present embodiment and the number of the constituent elements of the power conversion device 100 of the comparative example on the condition that the fluctuation of the common-mode voltage CV1 is avoided are shown in Table 5 below. As shown in Table 5, the power conversion device 1 of the present embodiment requires fewer constituent elements as compared with the power conversion device 100 of the comparative example. It is therefore possible to reduce the cost.

TABLE 5

| Output level number | Comparative example | | | First Embodiment | | |
|---|---|---|---|---|---|---|
| | Switch | Diode | Voltage source | Switch | Diode | Voltage source |
| 3 | 8 | 12 | 2 | 6 | 6 | 1 |
| 5 | 16 | 24 | 4 | 10 | 10 | 2 |
| 7 | 24 | 40 | 6 | 14 | 14 | 3 |

Meanwhile, the control unit 5 may control the on/off of the regenerative switches $Q1_1$ to $Q1_N$ and $Q2_1$ to $Q2_N$ of the voltage control units $2_1$ to $2_N$ according to the condition shown in the following Table 6. More specifically, when the output voltage V1 is the power source voltage $E_M$ of the voltage source $VS_M$ electrically connected to an arbitrary voltage control unit $2_M$, the control unit 5 may keep the regenerative switches $Q1_M$ and $Q2_M$ of the arbitrary voltage control unit $2_M$ in an on state. In addition, when the output voltage V1 is the power source voltage $E_{M-1}$ lower by one level than the power source voltage $E_M$, the control unit 5 may keep the regenerative switches $Q1_M$ and $Q2_M$ of the arbitrary voltage control unit $2_M$ in an on state.

TABLE 6

| $Q1_1$, $Q2_1$ | $|V1| = E_1 V0$ (V) | ON |
|---|---|---|
| | Other than the above | OFF |
| $Q1_M$, $Q2_M$ | $|V1| = E_M V E_{M-1}$ (V) | ON |
| | Other than the above | OFF |
| $Q1_N$, $Q2_N$ | $|V1| = E_N V E_{N-1}$ (V) | ON |
| | Other than the above | OFF |

Figure 10:
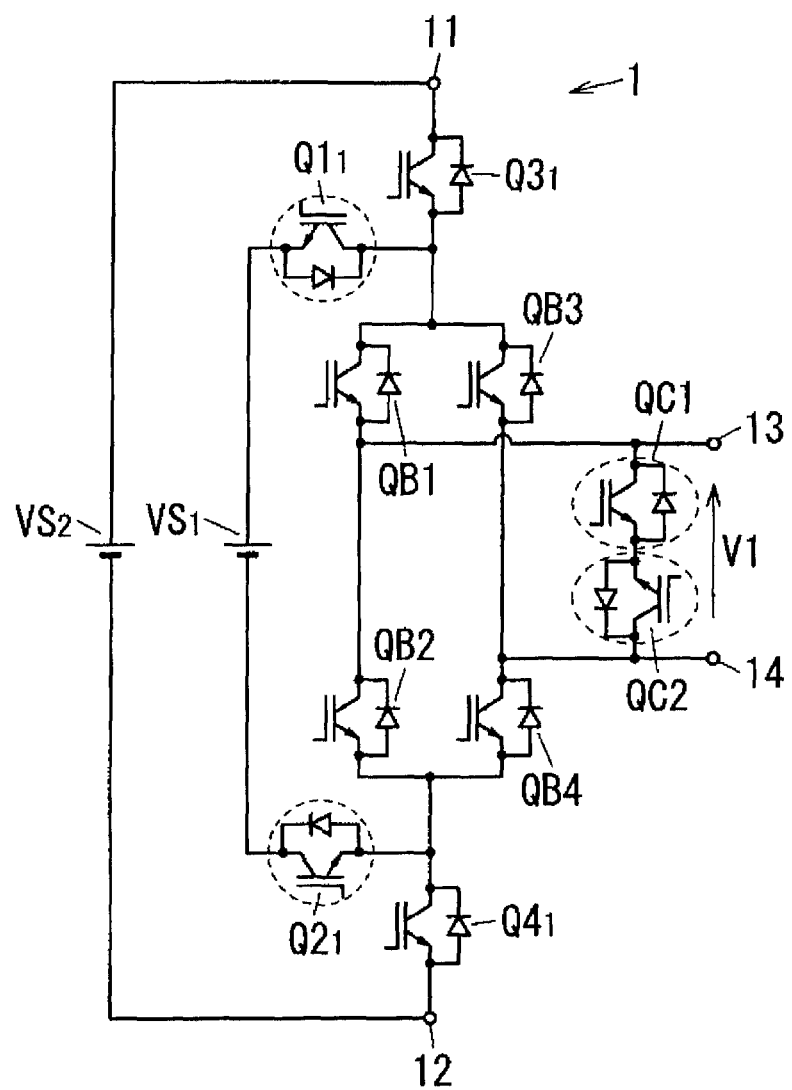
FIG. 10 is a diagram for explaining the operation of the power conversion device according to the first embodiment, which is composed of a 5-level inverter.

As an example, description will be made on a case where the power conversion device 1 of the present embodiment is composed of a 5-level inverter as shown in FIG. 2. In this case, the control unit 5 keeps the regenerative switches $Q1_1$ and $Q2_1$ of the voltage control unit $2_1$ in an on state not only when the output voltage V1 of 1 [V] is generated but also when the output voltage V1 is 0 [V] as shown in FIG. 10. In FIG. 10, the switch surrounded by a circle is in an on state, and the switch not surrounded by a circle is in an off state.

With this configuration, there is no need to switch on and off the regenerative switches $Q1_1$ to $Q1_N$ and $Q2_1$ to $Q2_N$ of the voltage control units $2_1$ to $2_N$ in a short period of time. Therefore, in this configuration, it is possible to use elements operating at a low speed as the regenerative switches $Q1_1$ to $Q1_N$ and $Q2_1$ to $Q2_N$. This makes it possible to reduce the cost.

Furthermore, the control unit 5 may control the on/off of the holding switches QC1 and QC2 of the clamp unit 4 according to the condition shown in the following Table 7. Specifically, the clamp unit 4 is composed of a series circuit of the holding switches QC1 and QC2 electrically connected between the output points 33 and 34 of the conversion unit 3. When the output voltage V1 is larger than a predetermined voltage (in this example, 0 [V]), the control unit 5 may perform control to keep the second holding switch QC2 of the holding switches QC1 and QC2 in an on state. Moreover, when the output voltage is lower than the predetermined voltage, the control unit 5 may perform control to keep the first holding switch QC1 of the holding switches QC1 and QC2 in an on state.

TABLE 7

| QC1 | V1 ≤ 0 (V) | ON |
|---|---|---|
| | Other than the above | OFF |
| QC2 | V1 ≥ 0 (V) | ON |
| | Other than the above | OFF |

Figure 11A:
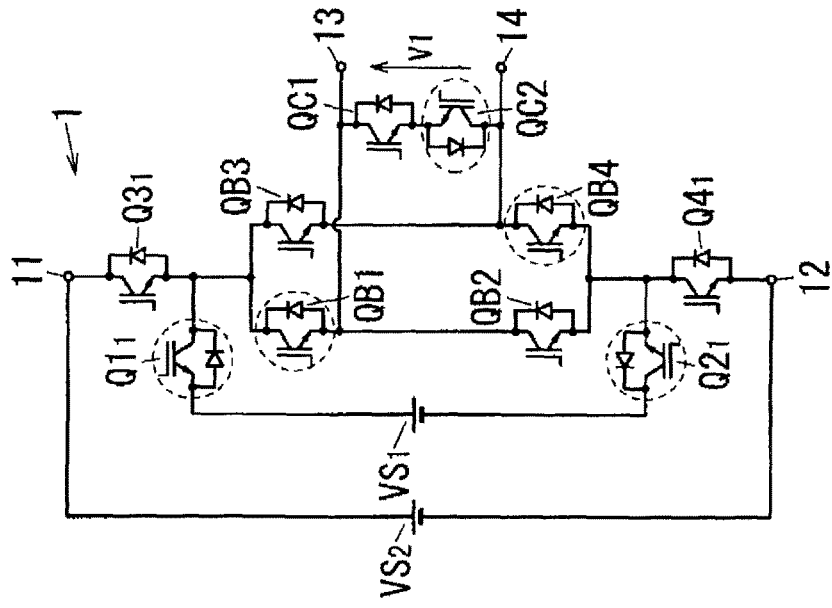
FIGS. 11A and 11B are diagrams for explaining the operation of the power conversion device according to the first embodiment, which is composed of a 5-level inverter.
Figure 11B:
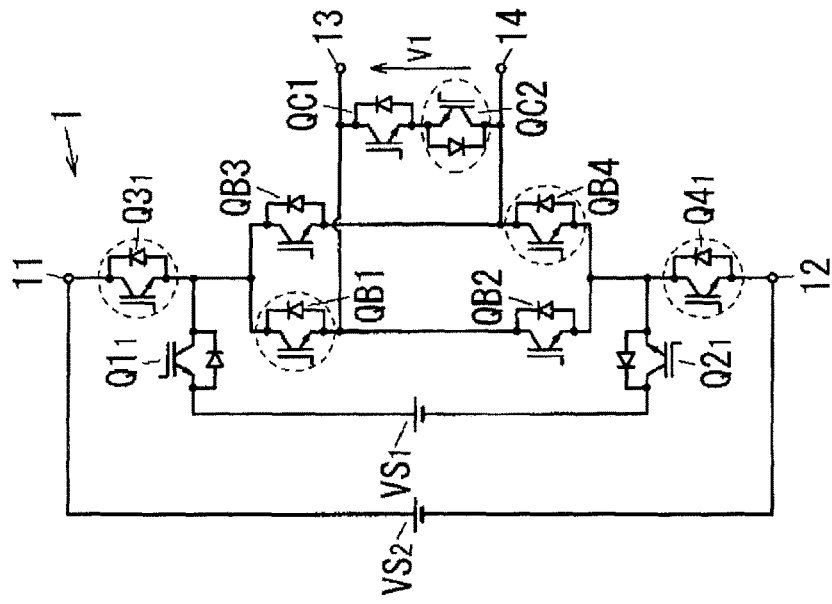

As an example, description will be made on a case where the power conversion device 1 of the present embodiment is composed of a 5-level inverter as shown in FIG. 2. In this case, the control unit 5 keeps the second holding switch QC2 of the clamp unit 4 in an on state either when the output voltage V1 of 2 [V] is generated as shown in FIG. 11A or when the output voltage V1 of 1 [V] is generated as shown in FIG. 11B. In FIGS. 11A and 11B, the switch surrounded by a circle is in an on state, and the switch not surrounded by a circle is in an off state.

With this configuration, there is no need to switch on and off the holding switches QC1 and QC2 of the clamp unit 4 in a short period of time. Therefore, in this configuration, it is possible to use elements operating at a low speed as the holding switches QC1 and QC2. This makes it possible to reduce the cost.

Meanwhile, in the power conversion device 1 according to the present embodiment, as shown in Table 1, the regenerative switch $Q1_M$ and the regenerative switch $Q2_M$ are switched on and off at the same timing. Similarly, the input switch $Q3_M$ and the input switch $Q4_M$ are switched on and off at the same timing. In addition, the first switch QB1 and the fourth switch QB4 of the conversion unit 3 are switched on and off at the same timing. Similarly, the second switch QB2 and the third switch QB3 of the conversion unit 3 are switched on and off at the same timing.

Therefore, in the power conversion device 1 of the present embodiment, the control unit 5 may drive the regenerative switches $Q1_M$ and $Q2_M$ in an arbitrary voltage control unit $2_M$ with one drive signal. Further, the control unit 5 may drive the input switches $Q3_M$ and $Q4_M$ in an arbitrary voltage control unit $2_M$ with one drive signal. Moreover, the control unit 5 may drive a high-side switch QB1 of a first leg of a pair of legs of the conversion unit 3 and a low-side switch QB4 of a second leg of the pair of legs of the conversion unit 3 with one drive signal. In this regard, the first leg is a series circuit of the switches QB1 and QB2, and the second leg is a series circuit of the switches QB3 and QB4. However, the first leg and the second leg may be reversed. With this configuration, it is possible to reduce the number of signal lines for drive signals. In addition, with this configuration, it is possible to prevent the on/off timings from being deviated in a pair of switches driven by one drive signal.

Meanwhile, in the power conversion device 1 of the present embodiment, as shown in the following Table 8, the control unit 5 may perform control to provide the dead times DT1 to DT4 when changing the output voltage V1. At the dead times DT1 to DT4, the control unit 5 switches all the switches off. By performing control in this manner, it is possible to prevent short-circuiting between the first input point 11 and the second input point 12 of the power conversion device when changing the output voltage V1.

TABLE 8

| V1 (V) | Q1₁, Q2₁ | Q3₁, Q4₁ | QB1, QB4 | QB2, QB3 | QC1, QC2 |
|---|---|---|---|---|---|
| 2 | OFF | ON | ON | OFF | OFF |
| (DT1) | OFF | OFF | OFF | OFF | OFF |
| 1 | ON | OFF | ON | OFF | OFF |
| (DT2) | OFF | OFF | OFF | OFF | OFF |
| 0 | OFF | OFF | OFF | OFF | ON |
| (DT3) | OFF | OFF | OFF | OFF | OFF |
| −1 | ON | OFF | OFF | ON | OFF |
| (DT4) | OFF | OFF | OFF | OFF | OFF |
| −2 | OFF | ON | OFF | ON | OFF |

Figure 12:
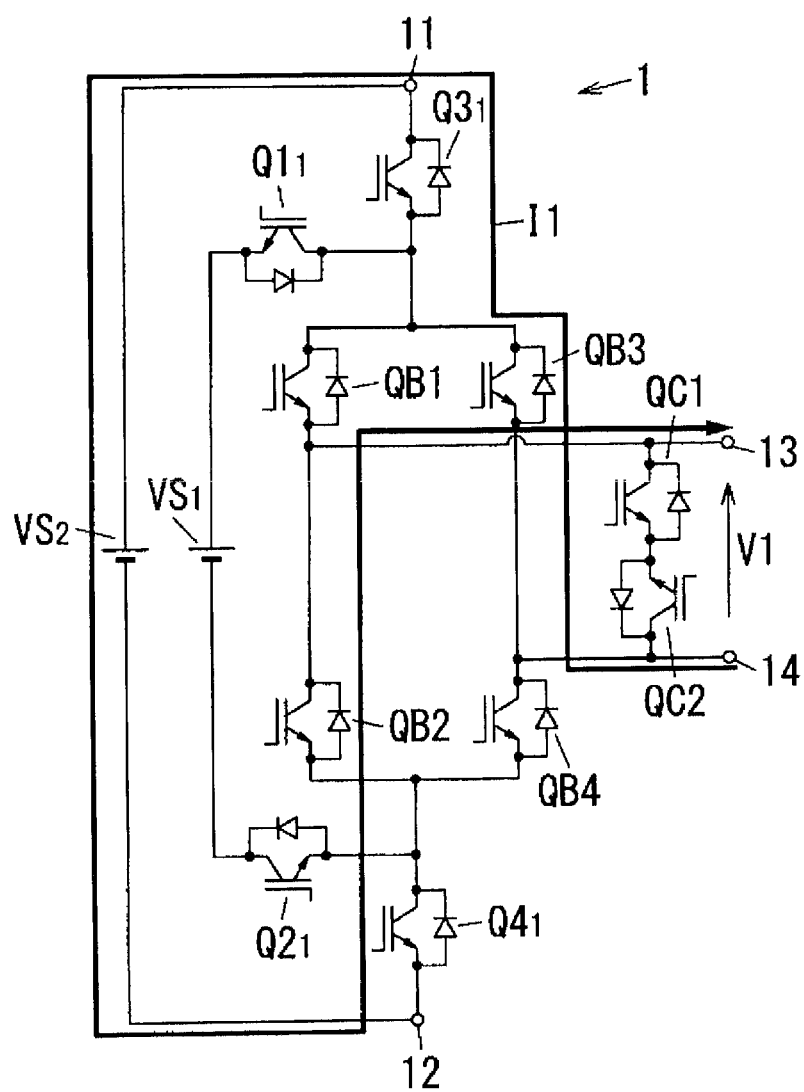
FIG. 12 is a diagram for explaining the operation of the power conversion device according to the first embodiment, which is composed of a 5-level inverter.

However, at the above dead times DT1 to DT4, as shown in FIG. 12, a current I1 flows through a path extending through the recovery diodes of the switches QB3, Q3₁, Q4₁ and QB2 and the main voltage source VS2. Therefore, at the dead times DT1 to DT4, the power source voltage $E_{N+1}$ [V] (in this example, 2 [V]) of the main voltage source $VS_{N+1}$ is applied between the first input point 11 and the second input point 12 of the power conversion device. Therefore, in this case, there is a possibility that the power source voltage $E_{N+1}$ [V] of the main voltage source $VS_{N+1}$ is applied at the maximum to the respective switches constituting the voltage control units 2₁ to 2_N. Thus, the necessary withstand voltage is determined by the power source voltage $E_{N+1}$ of the main voltage source $VS_{N+1}$. For this reason, it is necessary to use an element with a high withstand voltage for each switch constituting the voltage control units 2₁ to 2_N, thereby resulting in an increase in cost.

Therefore, in the power conversion device 1 of the present embodiment, it is preferable that the control unit 5 performs control as follows. Specifically, the control unit 5 controls the respective switches of the N voltage control units 2₁ to 2_N, the conversion unit 3 and the clamp unit 4 so as to provide the dead times DT1 to DT4 when changing the output voltage V1. Then, at the dead times DT1 to DT4, the control unit 5 performs control to maintain, in an on state, the switches which are kept in an on state before or after the change of the output voltage V1, and to switch off other switches.

Figure 14A:
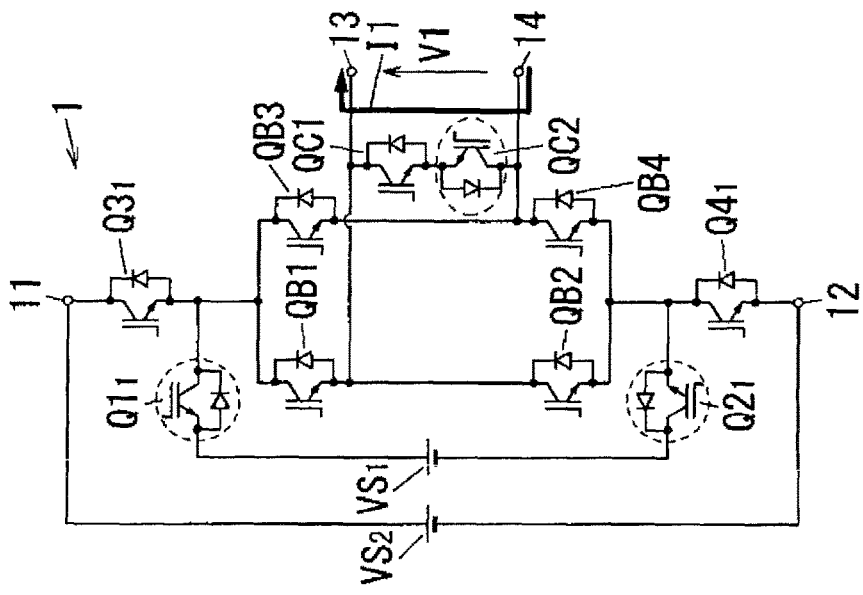
FIGS. 14A and 14B are diagrams for explaining the operation of the power conversion device according to the first embodiment, which is composed of a 5-level inverter.
Figure 14B:
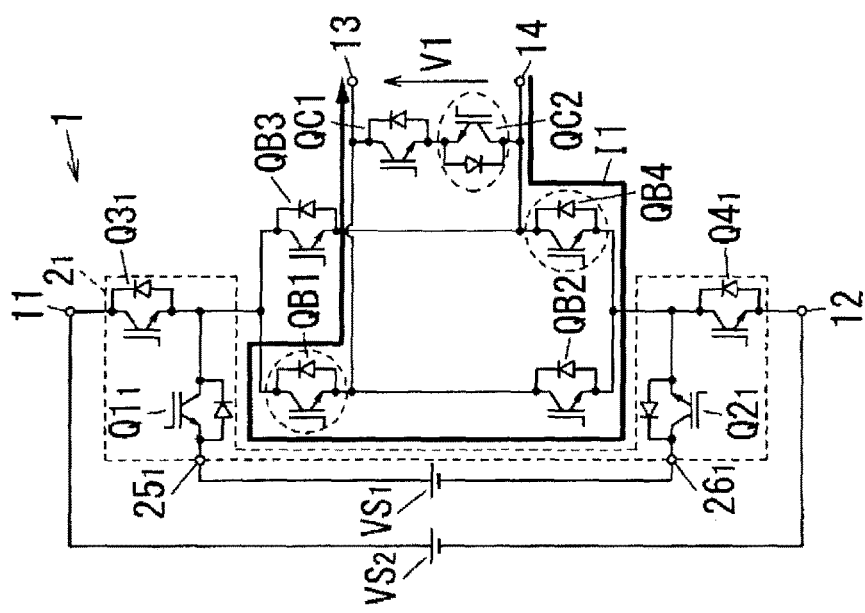

As an example, description will be made on a case where the power conversion device 1 of the present embodiment is composed of a 5-level inverter as shown in FIG. 2. For the sake of description, the paths of a current I1 in the state of generating the output voltage V1 of 2 [V], the state of generating the output voltage V1 of 1 [V] and the state of setting the output voltage V1 to 0 [V] are shown in FIGS. 13A to 13C. Furthermore, the paths of a current I1 at the dead times DT1 and DT2 are shown in FIGS. 14A and 14B. In FIGS. 13A to 13C and FIGS. 14A and 14B, the switch surrounded by a circle is in an on state, and the switch not surrounded by a circle is in an off state.

In this case, the control unit 5 controls the respective switches of the voltage control unit 2₁, the conversion unit 3 and the clamp unit 4 according to the condition shown in the following Table 9. For example, at the dead time DT1, the control unit 5 maintains, in an on state, the switches QB1, QB4 and QC2 which are kept in an on state before or after the change of the output voltage V1, and switches off the other switches. Then, as shown in FIG. 14A, instead of applying the power source voltage E₂ [V] of the main voltage source VS₂ to the first input point 11 and the second input point 12 of the power conversion device, the power source voltage E₁ [V] of the voltage source VS₁ is applied to the third input point 25₁ and the fourth input point 26₁ of the voltage control unit 2₁.

Furthermore, for example, at the dead time DT2, the control unit 5 maintains, in an on state, the switches Q1₁, Q2₁ and QC2 which are kept in an on state before or after the change of the output voltage V1, and switches off the other switches. Then, as shown in FIG. 14B, instead of applying the power source voltage E2 [V] of the main voltage source VS₂ to the first input point 11 and the second input point 12 of the power conversion device, the voltage between the first output point 13 and the second output point 14 is caused to become 0 [V].

TABLE 9

| V1 [V] | Q1₁ | Q2₁ | Q3₁ | Q4₁ | QB1 | QB2 | QB3 | QB4 | QC1 | QC2 |
|---|---|---|---|---|---|---|---|---|---|---|
| 2 | OFF | OFF | ON | ON | ON | OFF | OFF | ON | OFF | ON |
| (DT1) | OFF | OFF | OFF | OFF | ON | OFF | OFF | ON | OFF | ON |
| 1 | ON | ON | OFF | OFF | ON | OFF | OFF | ON | OFF | ON |
| (DT2) | ON | ON | OFF | OFF | OFF | OFF | OFF | OFF | OFF | ON |
| 0 | ON | ON | OFF | OFF | OFF | OFF | OFF | OFF | ON | ON |
| (DT3) | ON | ON | OFF | OFF | OFF | OFF | OFF | OFF | ON | OFF |
| −1 | ON | ON | OFF | OFF | OFF | ON | ON | OFF | ON | OFF |
| (DT4) | OFF | OFF | OFF | OFF | OFF | ON | ON | OFF | ON | OFF |
| −2 | OFF | OFF | ON | ON | OFF | ON | ON | OFF | ON | OFF |

That is to say, in this configuration, the minimum required withstand voltage of each of the regenerative switches $Q1_M$ and $Q2_M$ and the input switches $Q3_M$ and $Q4_M$ in an arbitrary voltage control unit $2_M$ is '$E_{M+1}-E_M$' [V] as sown in the following Table 10. For example, it is assumed that the voltage difference between the main voltage source $VS_{N+1}$ and the voltage source $VS_N$ and the voltage difference between the arbitrary voltage source $VS_M$ and the voltage source $VS_{M+1}$ at the next stage are E1 [V]. In this case, the minimum required withstand voltage of each of the regenerative switches $Q1_M$ and $Q2_M$ and the input switches $Q3_M$ and $Q4_M$ in the arbitrary voltage control unit $2_M$ is E1 [V].

TABLE 10

| Switch | Minimum required withstand voltage [V] |
|---|---|
| Q1₁, Q2₁ | $E_2-E_1$ |
| $Q1_M$, $Q2_M$ | $E_{M+1}-E_M$ |
| $Q1_N$, $Q2_N$ | $E_{N+1}-E_N$ |
| Q3₁, Q4₁ | $E_2-E_1$ |
| $Q3_M$, $Q4_M$ | $E_{M+1}-E_M$ |
| $Q3_N$, $Q4_N$ | $E_{N+1}-E_N$ |
| QB1, QB4 | $E_{N+1}$ |
| QB2, QB3 | $E_{N+1}$ |
| QC1, QC2 | $E_{N+1}$ |

As described above, in this configuration, it is possible to reduce the minimum required withstand voltage of each switch constituting the voltage control units $2_1$ to $2_N$. Thus, it is not necessary to use an element having a high withstand voltage element. This makes it possible to reduce the cost. In this configuration, it is possible to reduce the frequency of on/off switching of each of the regenerative switches $Q1_1$ to $Q1_N$ and $Q2_1$ to $Q2_N$ of the voltage control units $2_1$ to $2_N$, the switches QB1 to QB4 of the conversion unit 3 and the holding switches QC1 and QC2 of the clamp unit 4. Therefore, in this configuration, the switching loss can be reduced.

In addition, in the aforementioned configuration, it is preferable that the control unit 5 controls the respective switches of the voltage control units $2_1$ to $2_N$, the conversion unit 3 and the clamp unit 4 to change the output voltage V1 step by step. That is to say, it is preferable that the control unit 5 controls the respective switches of the N voltage control units $2_1$ to $2_N$, the conversion unit 3 and the clamp unit 4 so that the output voltage V1 increases sequentially from the minimum value or decreases sequentially from the maximum value. As an example, description will be made on a case where the power conversion device 1 of the present embodiment is composed of a 5-level inverter as shown in FIG. 2. In this case, when the output voltage V1 is changed from 2 [V] to 0 [V] without going through a state in which the output voltage V1 is 1 [V], the power source voltage $E_2$ [V] of the main voltage source $VS_2$ is applied to the first input point 11 and the second input point of the power conversion device at the dead time. Therefore, the minimum required withstand voltage of the switches QB1 to QB4 of the conversion unit 3 is determined by the power source voltage $E_2$ [V] of the main voltage source $VS_2$.

On the other hand, if the control unit 5 performs control so that the output voltage V1 is changed to 2 [V], 1 [V] and 0 [V] step by step, the minimum required withstand voltage of the switches QB1 to QB4 of the conversion unit 3 may be equal to the power source voltage $E_1$ [V] of the voltage source $VS_1$. Therefore, in this configuration, it is not necessary to use elements with a high withstand voltage for the switches QB1 to QB4 of the conversion unit 3. This makes it possible to reduce the cost.

Figure 16A:
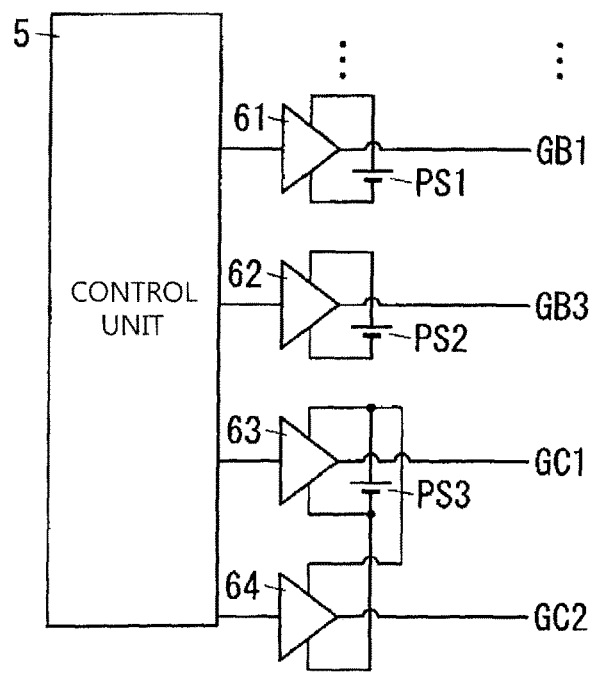
FIG. 16A is a diagram showing a control unit and individual driver circuits before the change.

Meanwhile, as shown in FIG. 16A, the drive signals applied to the switches QB1 and QB3 of the conversion unit 3 are defined as drive signals GB1 and GB3, and the drive signals applied to the switches QC1 and QC2 of the clamp unit 4 are defined as drive signals GC1 and GC2. The drive signals GB1 and GB3 are buffered by drive circuits 61 and 62, respectively, and are then applied to the switches QB1 and QB3 of the conversion unit 3. The drive signals GC1 and GC2 are buffered by drive circuits 63 and 64, respectively, and are then applied to the holding switches QC1 and QC2 of the clamp unit 4. In order to drive the switches QB1 and QB3 and the holding switches QC1 and QC2, it is necessary to apply a voltage between the gate and the emitter. For this reason, the drive circuits 61 to 64 require a drive power source in which the emitter potentials of the switches QB1 and QB3 and the holding switches QC1 and QC2 are used as a reference potential.

When the power conversion device 1 of the present embodiment is composed of the 5-level inverter shown in FIG. 2, the emitter potentials of the holding switches QC1 and QC2 of the clamp unit 4 are the same. However, these emitter potentials are different from the emitter potential of each of the switches QB1 and QB3 of the conversion unit 3. Therefore, as shown in FIG. 16A, it is impossible to drive the drive circuits 61 to 64 unless the three drive power sources PS1 to PS3 having these emitter potentials as a reference potential are prepared.

Figure 15:
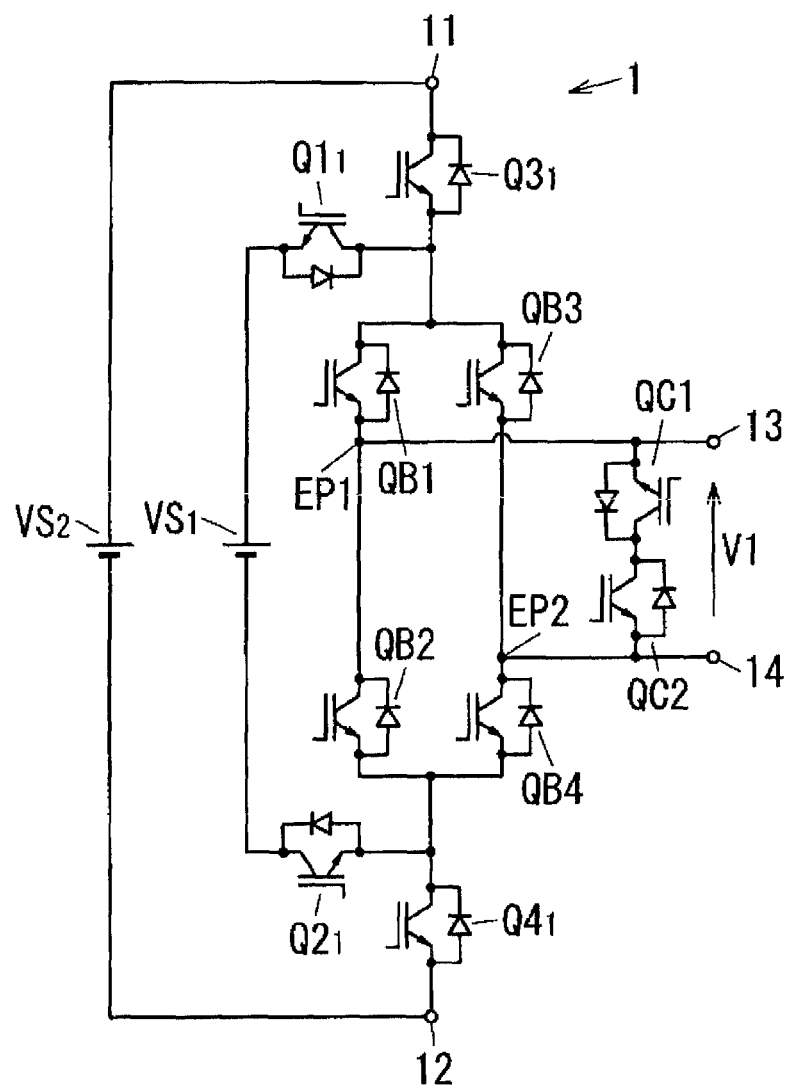
FIG. 15 is a circuit diagram in which a partial configuration of the power conversion device according to the first embodiment, which is composed of a 5-level inverter, is changed.

Accordingly, in the power conversion device 1 of the present embodiment, the emitter of any one of the switches QB1 to QB4 of the conversion unit 3 may be electrically connected to the emitter of any one of the holding switches QC1 and QC2 of the clamp unit 4. Hereinafter, a case where the power conversion device 1 of the present embodiment is composed of a 5-level inverter will be described with reference to FIG. 15. In this configuration, as shown in FIG. 15, the emitter of the first switch QB1 of the conversion unit 3 is electrically connected to the emitter of the first holding switch QC1 of the clamp unit 4. The emitter of the third switch QB3 of the conversion unit 3 is electrically connected to the emitter of the second holding switch QC2 of the clamp unit 4.

Figure 16B:
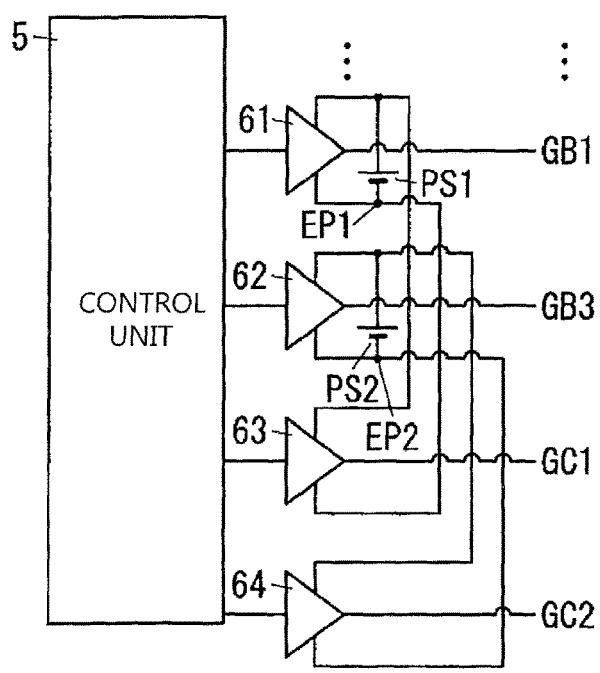
FIG. 16B is a diagram showing a control unit and individual driver circuits after the change.

In this case, the emitter potential of each of the first switch QB1 of the conversion unit 3 and the first holding switch QC1 of the clamp unit 4 becomes a common first emitter potential EP1. In addition, the emitter potential of each of the third switch QB3 of the conversion unit 3 and the second hold switch QC2 of the clamp unit 4 becomes a common second emitter potential EP2. Therefore, in this configuration, as shown in FIG. 16B, the first driver circuit 61 and the third driver circuit 63 can be driven by the first drive power source PS1 in which the first emitter potential EP1 is used as a reference potential. In addition, in this configuration, the second driver circuit 62 and the fourth driver circuit 64 can be driven by the second drive power source PS2 in which the second emitter potential EP2 is used as a reference potential.

As described above, in this configuration, it is possible to reduce the number of drive power sources, thereby reducing the size of a circuit. In addition, in this configuration, cost reduction can be achieved because it is possible to reduce the number of drive power sources.

Furthermore, in the power conversion device 1 of the present embodiment, the emitters of the switches QB2 and QB4 of the conversion unit 3 and the emitter of the regenerative switch $Q2_1$ of the voltage controller $2_1$ are electrically connected to each other as shown in FIG. 1. The voltage control unit $2_1$ is electrically connected directly to the conversion unit 3. Similarly, the emitter of the input switch $Q4_{M-1}$ of an arbitrary voltage control unit $2_{M-1}$ and the emitter of the regenerative switch $Q2_M$ of the voltage control unit $2_M$ of the next stage are electrically connected to each other. Accordingly, the switches QB2 and QB4 of the conversion unit 3 and the regenerative switch $Q2_1$ of the voltage control unit $2_1$ have a common emitter potential and, therefore, can be driven by a common drive power source. Similarly, the input switch $Q4_{M-1}$ of an arbitrary voltage control unit $2_{M-1}$ and the regenerative switch $Q2_M$ of the voltage control unit $2_M$ of the next stage have a common emitter potential and, therefore, can be driven by a common drive power source.

Figure 17A:
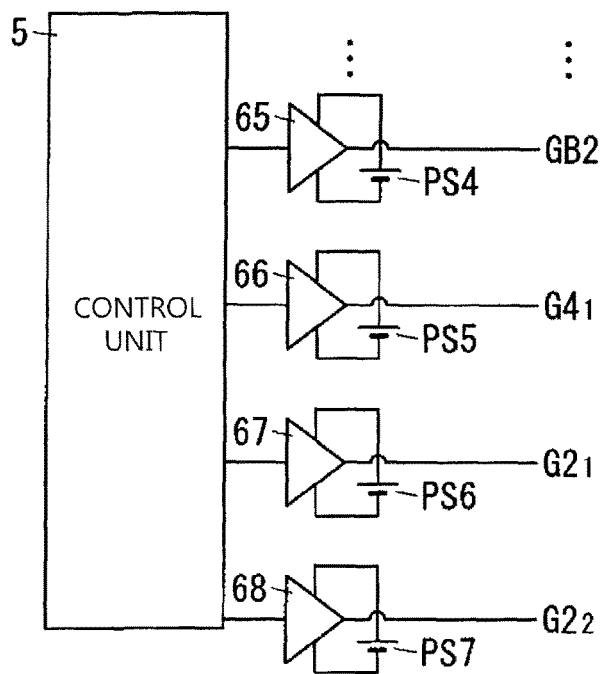
FIG. 17A is a diagram showing a control unit and individual driver circuits before the change.

Hereinafter, description will be made on a case where the power conversion device 1 of the present embodiment is composed of a 7-level inverter shown in FIG. 5. For example, as shown in FIG. 17A, the drive signal applied to the switch QB2 of the conversion unit 3 is defined as a drive signal GB2, and the driving signals applied to the input switch $Q4_1$ and the regenerative switch $Q2_1$ of the voltage control unit $2_1$ are defined as drive signals $G4_1$ and $G2_1$, respectively. Further, the drive signal applied to the regenerative switch $Q2_2$ of the voltage control unit $2_2$ is defined as a drive signal $G2_2$. The drive signals GB2 and $G4_1$ are respectively buffered by drive circuits 65 and 66, and then applied to the switches QB2 and $Q4_1$. In addition, the drive signals $G2_1$ and $G2_2$ are respectively buffered by drive circuits 67 and 68, and then applied to switches $Q2_1$ and $Q2_2$.

Figure 17B:
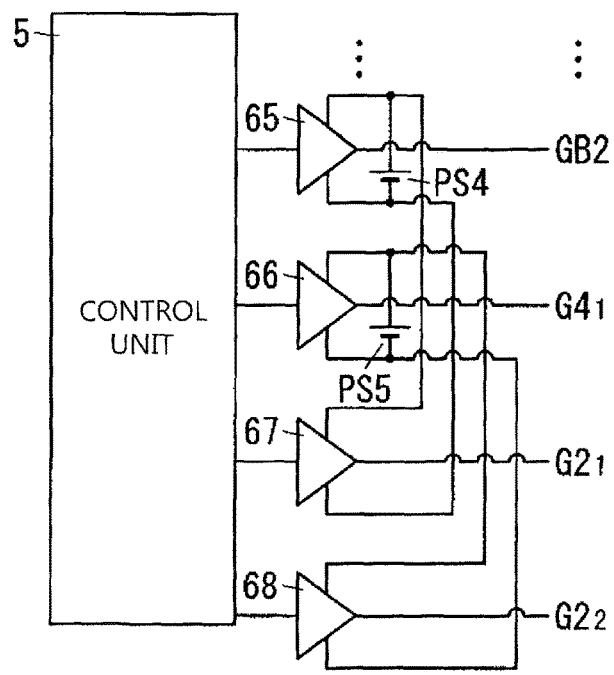
FIG. 17B is a diagram showing a control unit and individual driver circuits after the change.

In the configuration shown in FIG. 17A, drive power sources PS4 to PS7 are individually provided to drive the switches QB2, $Q4_1$, $Q2_1$ and $Q2_2$. On the other hand, in the configuration shown in FIG. 17B, the emitter of the switch QB2 and the emitter of the regenerative switch $Q2_1$ are at the same potential. Thus, the switches QB2 and $Q2_1$ are driven by one drive power source PS4. Likewise, the emitter of the input switch $Q4_1$ and the emitter of the regenerative switch $Q2_2$ are at the same potential. Thus, the switches $Q4_1$ and $Q2_2$ are driven by one drive power source PS5. In other words, the configuration shown in FIG. 17B can reduce the number of drive power sources as compared with the configuration shown in FIG. 17A.

As described above, in this configuration, it is possible to reduce the number of drive power sources, thereby reducing the size of a circuit. Specifically, as long as the power conversion device 1 of the present embodiment includes N voltage control units $2_1$ to $2_N$, it is possible to reduce the number of drive power sources by N as compared with a case where drive power sources are individually provided with respect to the respective switches. In addition, in this configuration, cost reduction can be achieved because it is possible to reduce the number of drive power sources. Whether to adopt this configuration is arbitrary.

Further, in the power conversion device 1 of the present embodiment, it is preferable that the voltage source VSM electrically connected to an arbitrary voltage control unit $2_M$ has its power source voltage $E_M$ equal to 'M/(N+1)' of the power source voltage $E_{N+1}$ of the main voltage source $VS_{N+1}$. In other words, it is preferable that the voltage source $VS_M$ having its power source voltage $E_M$ equal to 'M/(N+1)' of the power source voltage $E_{N+1}$ of the main voltage source $VS_{N+1}$ is electrically connected to the $M^{th}$ voltage control unit $2_M$ counted from the voltage control unit $2_1$ directly electrically connected to the conversion unit 3.

For example, it is assumed that the power conversion device 1 of the present embodiment is composed of a 7-level inverter (namely, N=2). In this case, it is preferable that the voltage source $VS_1$ electrically connected to the voltage control unit $2_1$ (namely, M=1) has its power source voltage $E_1$ equal to ⅓ of the output voltage $E_3$ of the main voltage source $VS_3$. Similarly, it is preferable that the voltage source $VS_2$ electrically connected to the voltage control unit $2_2$ (namely, M=2) has its power source voltage $E_2$ equal to ⅔ of the output voltage $E_3$ of the main voltage source $VS_3$.

In this configuration, the voltage difference between the main voltage source $VS_{N+1}$ and the voltage source $VS_N$ and the voltage difference between the arbitrary voltage source $VS_M$ and the next voltage source $VS_{M+1}$ are '$E_{N+1}/(N+1)$' [V]. Therefore, as shown in the following Table 11, it is possible to reduce the minimum required withstand voltage of each switch. For example, when the power conversion device of the present embodiment is composed of a 7-level inverter (namely, N=2) as shown in FIG. 5, the minimum required withstand voltage of each switch is $E_3/3=E1$ [V]. Accordingly, in this configuration, the withstand voltage required by each switch can be lowered. Thus, it is not necessary to use an element having a high withstand voltage. This makes it possible to reduce the cost. In addition, in this configuration, it is possible to relax the restrictions on the insulation distance to be considered when the respective switches are mounted on a board. Furthermore, in this configuration, the same type of elements can be used for the respective switches. This makes it possible to further reduce the cost.

TABLE 11

| Switch | Minimum required withstand voltage [V] |
| --- | --- |
| $Q1_1$, $Q2_1$ | $E_{N+1}/(N+1)$ |
| $Q1_M$, $Q2_M$ | $E_{N+1}/(N+1)$ |
| $Q1_N$, $Q2_N$ | $E_{N+1}/(N+1)$ |
| $Q3_1$, $Q4_1$ | $E_{N+1}/(N+1)$ |
| $Q3_M$, $Q4_M$ | $E_{N+1}/(N+1)$ |
| $Q3_N$, $Q4_N$ | $E_{N+1}/(N+1)$ |
| QB1, QB4 | $E_{N+1}/(N+1)$ |
| QB2, QB3 | $E_{N+1}/(N+1)$ |
| QC1, QC2 | $E_{N+1}/(N+1)$ |

Figure 18:
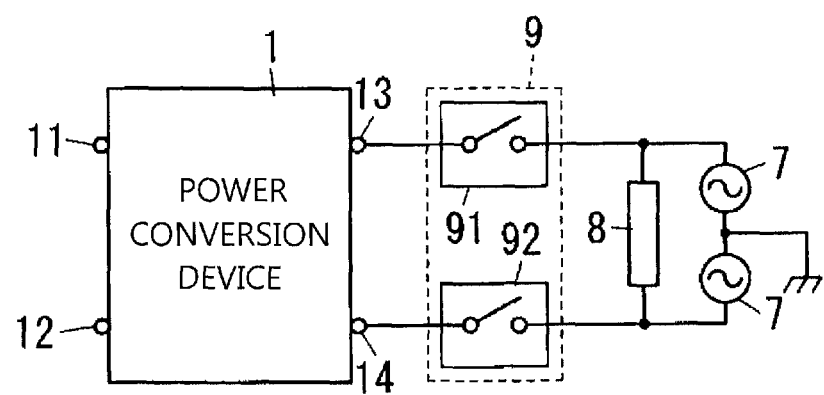
FIG. 18 is a schematic diagram showing an application example of the power conversion device according to the first embodiment.

Hereinafter, description will be made on a usage example in which the power conversion device 1 of the present embodiment is used as a power conditioner. As shown in FIG. 18, this usage example includes the power conversion device 1 of the present embodiment and a disconnector 9. The disconnector 9 is electrically connected between the first output point 13 and the second output point 14 of the power conversion device, and a system power source 7. Specifically, the first output point 13 and the second output point 14 of the power conversion device 1 are electrically connected via the disconnector 9 to an interconnection breaker (not shown) provided in a distribution board (not shown), whereby the first output point 13 and the second output point 14 of the power conversion device 1 are electrically connected to the system power source 7. In addition, a load 8 is electrically connected between the disconnector 9 and the system power source 7.

The disconnector 9 includes a first contact portion 91 electrically connected between the first output point 13 of the power conversion device and the system power source 7, and a second contact portion 92 electrically connected between the second output point 14 of the power conversion device and the system power source 7. However, the disconnector 9 may be electrically connected between at least one of the first output point 13 and the second output point 14 of the power conversion device and the system power source 7. Any one of the first contact portion 91 and the second contact portion 92 may be omitted.

In this usage example, the system interconnection operation is carried out in a steady state. The DC power inputted from the main voltage source $VS_{N+1}$ and the voltage sources $VS_1$ to $VS_N$ is converted into AC power by the power conversion device 1. The AC power is outputted to the system power source 7 and the load 8.

In this usage example, the control unit 5 may control the respective switches of the voltage control units $2_1$ to $2_N$, the conversion unit 3 and the clamp unit 4 so that the phase of the output AC voltage is opposite to the phase of the power source voltage of the system power source 7. In this configuration, the power conversion device 1 of the present embodiment can be used as a bidirectional inverter capable of charging and discharging the main voltage source $VS_{N+1}$ and the voltage sources $VS_1$ to $VS_N$.

Further, in this usage example, the control unit 5 may have a function of measuring the power source frequency of the system power source 7. The control unit 5 may control the respective switches of the voltage control units $2_1$ to $2_N$, the conversion unit 3 and the clamp unit 4 so that the phase of the output AC voltage is shifted from the phase of the power source voltage of the system power source 7.

In this configuration, reactive power can be injected into the system power source 7 by performing control as described above. When an abnormality such as power outage or the like occurs in the system power source 7, the power source frequency of the system power source 7 fluctuates due to the injection of reactive power. Therefore, by measuring the power source frequency of the system power source 7, the control unit 5 may determine whether an abnormality such as power outage or the like occurs in the system power source 7. As a result, the control unit 5 may determine whether the power conversion device 1 is operated alone.

Second Embodiment

Figure 19:
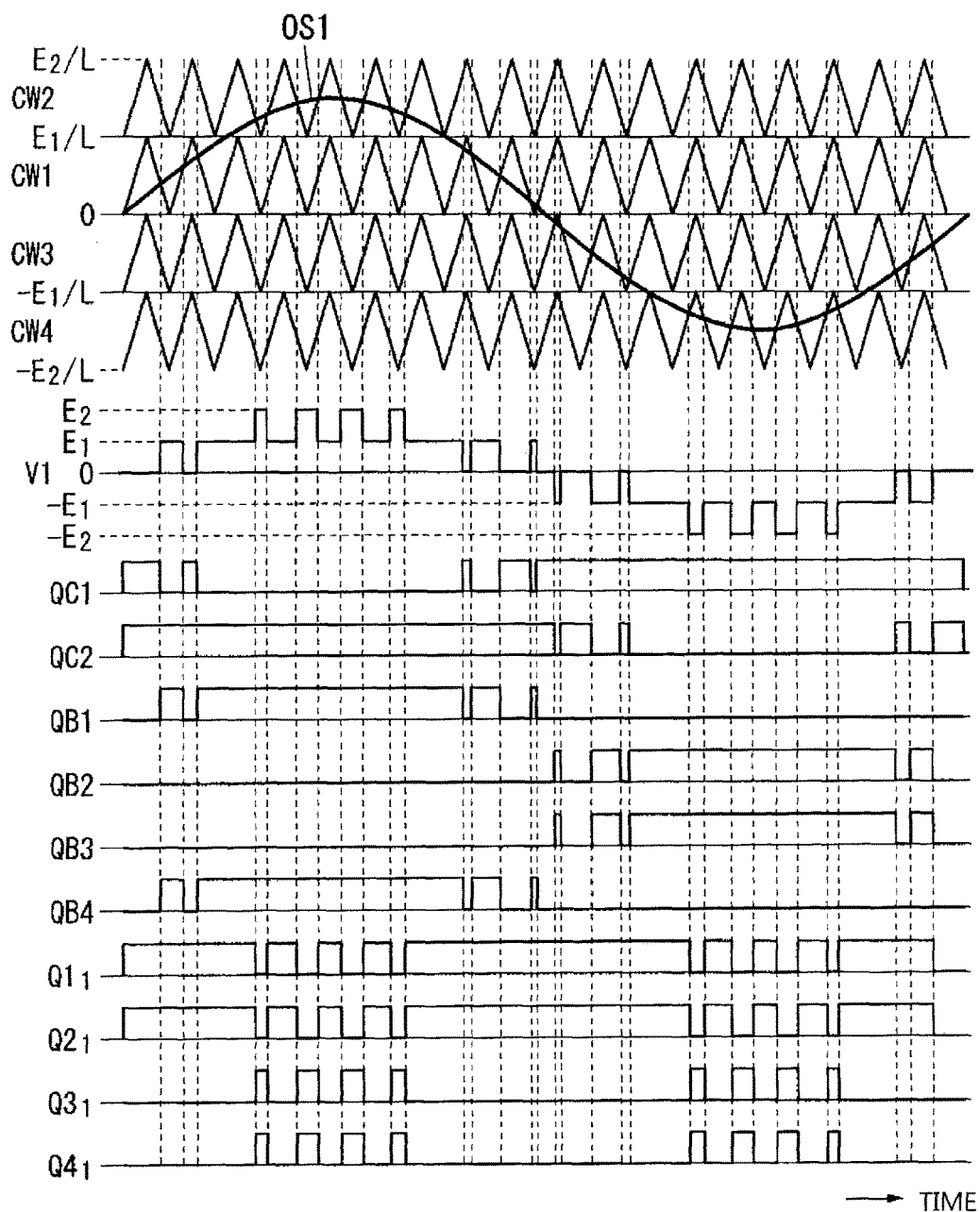
FIG. 19 is a diagram for explaining the operation of a power conversion device according to a second embodiment.

Hereinafter, a power conversion device 1 according to a second embodiment of the present invention will be described with reference to FIG. 19. The power conversion device 1 of the present embodiment has the same circuit configuration as the power conversion device 1 of the first embodiment. The power conversion device 1 of the present embodiment differs from the power conversion device 1 of the first embodiment in term of the operation of the control unit 5. In the power conversion device 1 of the present embodiment, description of components common to the power conversion device 1 of the first embodiment will be omitted as appropriate. Hereinafter, description will be made on a case where the power conversion device 1 of the present embodiment is composed of a 5-level inverter as shown in FIG. 2. Further, it is assumed that the power source voltage of the voltage source $VS_1$ is $E_1$ [V] and the power source voltage of the main voltage source $VS_2$ is $E_2$ [V]. Of course, it is not intended to limit the power conversion device 1 of the present embodiment to the 5-level inverter.

In the power conversion device 1 of the present embodiment, the control unit 5 controls the respective switches of the voltage control unit $2_1$, the conversion unit 3 and the clamp unit 4 according to the result of comparison of four carrier waves CW1 to CW4 with a target signal OS1.

The first carrier wave CW1 is a triangular wave having a minimum voltage value of 0 [V] and a maximum voltage value of $E_1/L$ [V]. The second carrier wave CW2 is a triangular wave having a minimum voltage value of $E_1/L$ [V] and a maximum voltage value of $E_2/L$ [V]. The third carrier wave CW3 is a triangular wave having a minimum voltage value of $-E_1/L$ [V] and a maximum voltage value of 0 [V]. The fourth carrier wave CW4 is a triangular wave having a minimum voltage value of $-E_2/L$ [V] and a maximum voltage value of $-E_1/L$ [V]. The carrier waves CW1 to CW4 are synchronized with each other. 'L' is an integer of 1 or more.

The target signal OS1 is a signal corresponding to a command value of a desired AC voltage outputted from the power conversion device 1. In the power conversion device 1 of the present embodiment, the target signal OS1 has the same voltage value as the command value and becomes a sine wave having a minimum voltage value of $-E_2/L$ [V] and a maximum voltage value of $E_2/L$ [V]. 'L' is an integer of 1 or more.

The control unit 5 compares the carrier waves CW1 to CW4 with the target signal OS1 and controls the respective switches of the voltage control unit $2_1$, the conversion unit and the clamp unit 4 so that the output voltage V1 is generated according to the condition shown in the following Table 12. When the target signal OS1 is equal to any one of the carrier waves CW1 to CW4 (for example, OS1=CW1, etc.), the output voltage V1 is not limited to the condition shown in Table 12 and may be defined as appropriate.

TABLE 12

|  | V1 (V) |
| --- | --- |
| CW2 < OS1 | $E_2$ |
| CW1 < OS1 ≤ CW2 | $E_1$ |
| CW3 ≤ OS1 ≤ CW1 | 0 |
| CW4 ≤ OS1 < CW3 | $-E_1$ |
| CW4 > OS1 | $-E_2$ |

For example, when the voltage value of the target signal OS1 is between the third carrier wave CW3 and the fourth carrier wave CW4, the control unit 5 switches on the first holding switch QC1 of the clamp unit 4, the switches QB2 and QB3 of the conversion unit 3 and the regenerative switches $Q1_1$ and $Q2_1$ of the voltage control unit $2_1$. In addition, the control unit 5 switches off the remaining switches. As a result, the power conversion device 1 of the present embodiment generates an output voltage V1 of $-E_1$ [V].

As described above, in the power conversion device 1 of the present embodiment, the control unit 5 controls the respective switches of the voltage control unit 21, the conversion unit 3 and the clamp unit 4 in accordance with the result of comparison of the four synchronized carrier waves CW1 to CW4 with the target signal OS1. As a result, by suitably switching the output voltage V1 with the control unit 5, the power conversion device 1 of the present embodiment outputs an AC voltage that varies between $-E_2$ [V] and $E_2$ [V] around 0 [V].

In the case where the power conversion device 1 of the present embodiment includes N voltage control units $2_1$ to $2_N$, the control unit 5 controls the respective switches of the voltage control units $2_1$ to $2_N$, the conversion unit 3 and the clamp unit 4 in accordance with the result of comparison of the 'N×2+2' synchronized carrier waves with the target signal OS1. Thus, by appropriately switching the output voltage V1 with the control unit 5, the power conversion device 1 of the present embodiment outputs an AC voltage that varies between $-E_{N+1}$ [V] and $E_{N+1}$ [V] around 0 [V].

Therefore, in the power conversion device 1 of the present embodiment, the number of times of changing the output voltage V1 to output a desired AC voltage is small. Thus, the number of times of switching on and off each switch is small. It is therefore possible to reduce the switching loss.

Figure 20:
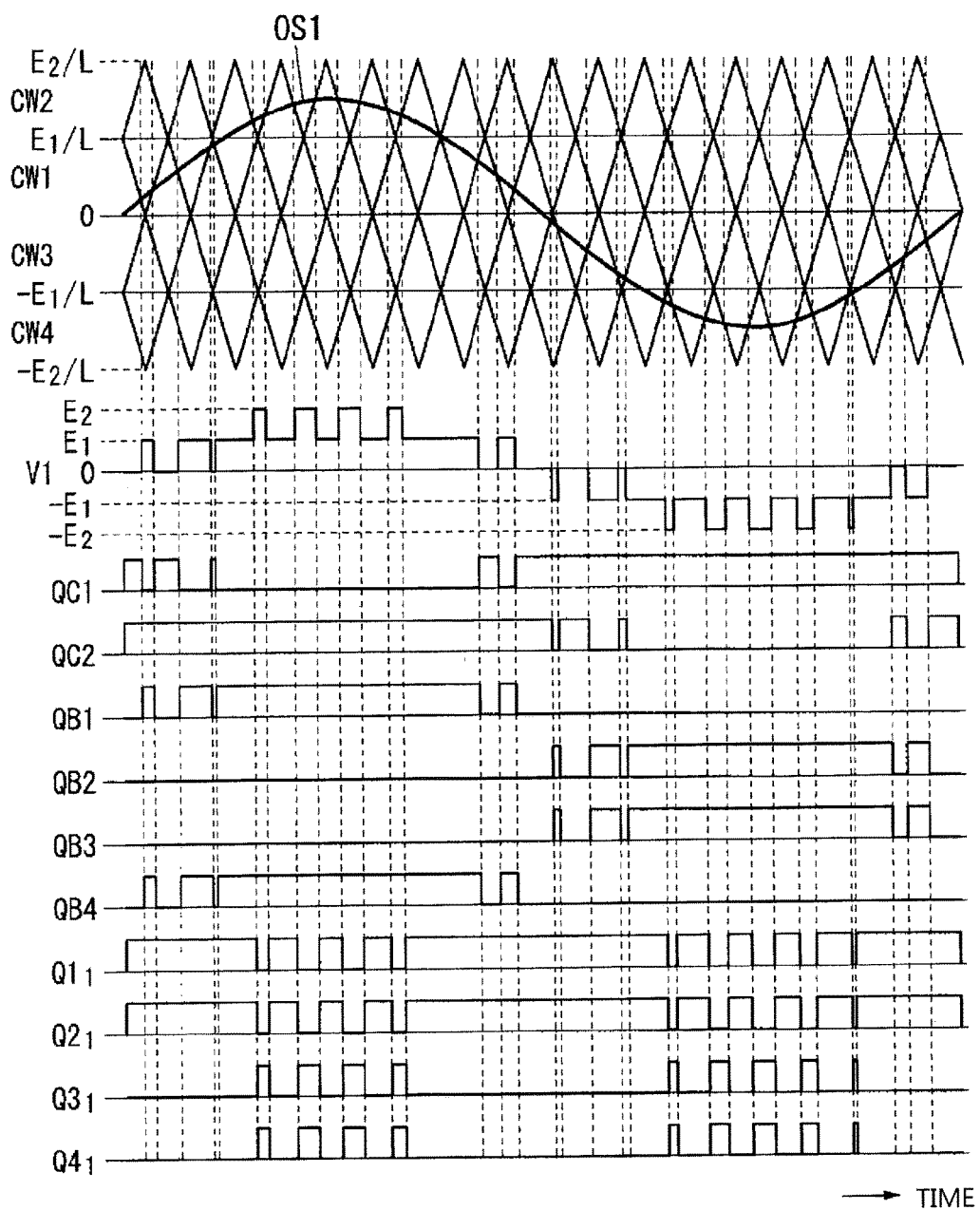
FIG. 20 is a diagram for explaining the operation of the power conversion device according to the second embodiment in the case where the phases of a first carrier wave and a fourth carrier wave are inverted.

Meanwhile, in the power conversion device 1 of the present embodiment, as shown in FIG. 20, the phases of the first carrier wave CW1 and the fourth carrier wave CW1 may be inverted. In this case, the control unit 5 compares the carrier waves CW1 to CW4 with the target signal OS1 and controls the respective switches of the voltage control unit $2_1$, the conversion unit 3 and the clamp unit 4 so that the output voltage V1 is generated according to the condition shown in Table 12.

In other words, the control unit 5 may control the respective switches of the voltage control units $2_1$ to $2_N$, the conversion unit 3 and the clamp unit 4 in accordance with the result of comparison of the 'N+1' carrier waves and the 'N+1' carrier waves having an inverted phase with the target signal OS1. In this configuration, the number of times of changing the output voltage V1 to output a desired AC voltage is constant. It is therefore possible to output an AC voltage with less distortion.

Configuration Example 1

Hereinafter, a power conversion device 1 according to configuration example 1 of the present embodiment will be described with reference to FIG. 21. In the power conversion device 1 of this configuration example, the control unit 5 controls the respective switches of the voltage control unit $2_1$, the conversion unit 3 and the clamp unit 4 according to the result of comparison of two carrier waves CW1 and CW2 with the target signal OS1 and the result of determination of whether a command value is positive or negative.

Figure 21:
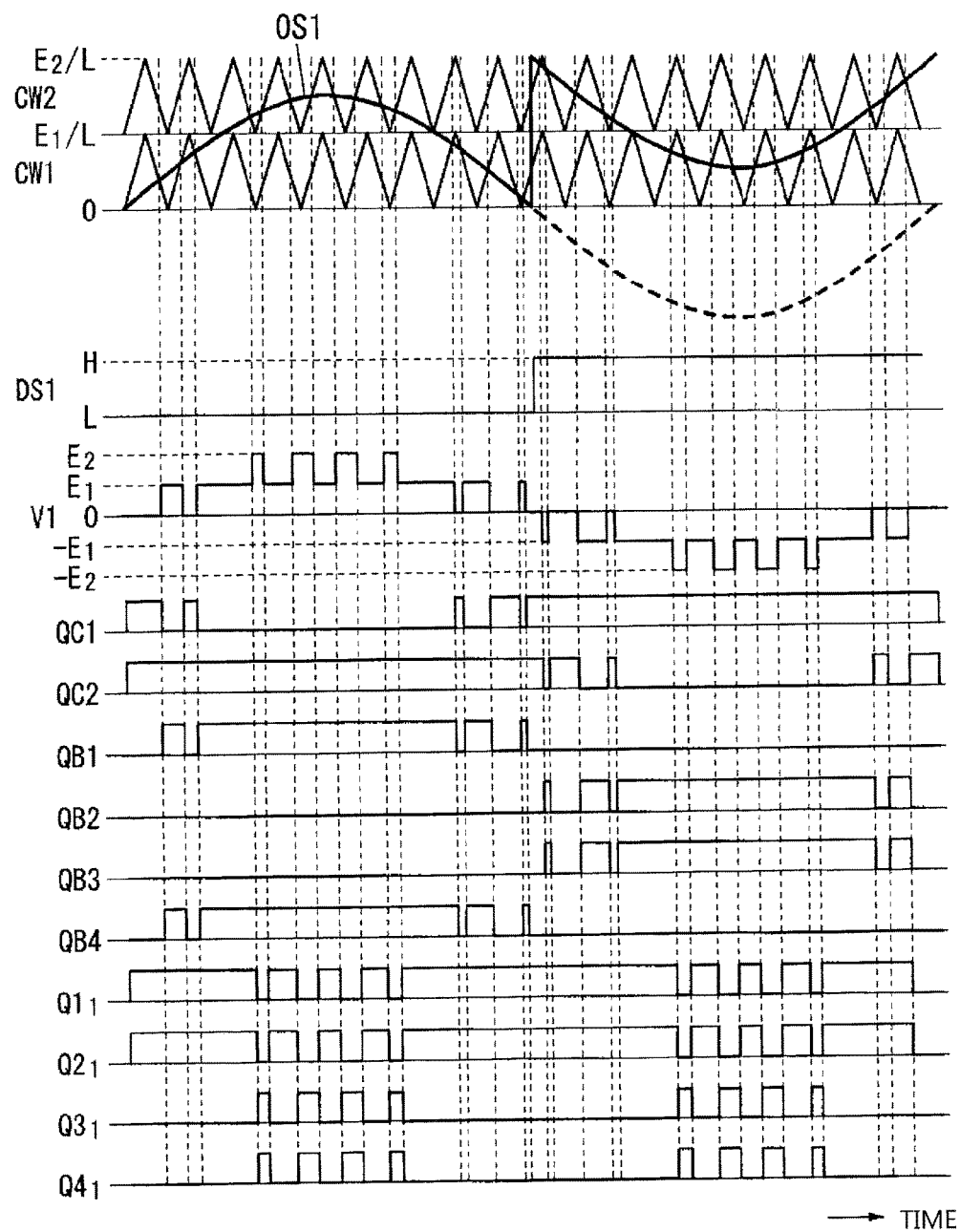
FIG. 21 is a diagram for explaining the operation of a power conversion device according to configuration example 1 of the second embodiment.

In FIG. 21, a first determination signal DS1 is a signal indicating the determination of whether a command value is positive or negative. The first determination signal DS1 becomes 'L' if the command value is positive and becomes 'H' if the command value is negative. When the command value is zero, the first determination signal DS1 may be appropriately defined. Furthermore, the target signal OS1 is a signal which is adjusted on the basis of the result of determination of whether the command value is positive or negative to fall between the minimum value and the maximum value of a plurality of carrier waves (carrier waves CW1 and CW2). In the power conversion device 1 of this configuration example, the target signal OS1 is a signal to which a predetermined voltage value is added in a period during which the command value is negative. In this regard, the predetermined voltage value is the difference between the minimum value of the first carrier wave CW1 and the maximum value of the second carrier wave CW2. That is to say, as shown in FIG. 21, the target signal OS1 shows the same voltage value as the command value while the first determination signal DS1 is 'L'. When the first determination signal DS1 becomes 'H', the target signal OS1 shows a voltage value obtained by adding '$E_2$/L' [V] to the command value.

The control unit 5 controls the respective switches of the voltage control unit $2_1$, the conversion unit 3 and the clamp unit 4 in accordance with the result of comparison of the carrier waves CW1 and CW2 with the target signal OS1 so that the output voltage V1 is generated according to the condition shown in the following Table 13. When the target signal OS1 is equal to any one of the carrier waves CW1 and CW2 (for example, OS1=CW1, etc.), the output voltage V1 is not limited to the condition shown in Table 13 but may be defined as appropriate.

TABLE 13

|  | DS1 | V1 (V) |
| --- | --- | --- |
| CW2 < OS1 | L | $E_2$ |
|  | H | 0 |
| CW1 ≤ OS1 ≤ CW2 | L | $E_1$ |
|  | H | $-E_1$ |
| CW1 > OS1 | L | 0 |
|  | H | $-E_2$ |

For example, a case where the voltage value of the target signal OS1 is between the first carrier wave CW1 and the second carrier wave CW2 will be described. In this case, if the first determination signal DS1 is 'L', the control unit 5 switches on the second holding switch QC2 of the clamp unit 4, the switches QB1 and QB4 of the conversion unit 3 and the regenerative switches $Q1_1$ and $Q2_1$ of the voltage control unit $2_1$, and switches off the remaining switches. As a result, the power conversion device 1 of this configuration example generates an output voltage V1 of $E_1$ [V]. When the first determination signal DS1 is 'H', the control unit 5 switches on the first holding switch QC1 of the clamp unit 4, the switches QB2 and QB3 of the conversion unit 3 and the regenerative switches $Q1_1$ and $Q2_1$ of the voltage control unit $2_1$, and switches off the remaining switches. As a result, the power conversion device 1 of this configuration example generates an output voltage V1 of $-E_1$ [V].

As described above, in the power conversion device 1 of this configuration example, the control unit 5 controls the respective switches of the voltage control unit $2_1$, the conversion unit 3 and the clamp unit 4 according to the result of comparison of the two synchronized carrier waves CW1 and CW2 with the target signal OS1 and the result of determination of whether the command value is positive or negative. Thus, by suitably switching the output voltage V1 with the control unit 5, the power conversion device 1 of this configuration example outputs an AC voltage that varies between $-E_2$ [V] and $E_2$ [V] around 0 [V].

In the case where the power conversion device 1 of this configuration example includes N voltage control units $2_1$ to $2_N$, the control unit 5 performs the following control. Specifically, the control unit 5 controls the respective switches of the voltage control units $2_1$ to $2_N$, the conversion unit 3 and the clamp unit 4 according to the result of comparison of the 'N+1' synchronized carrier waves with the target signal OS1 and the result of determination of whether the command value is positive or negative. Thus, by appropriately switching the output voltage V1 with the control unit 5, the power converter 1 of this configuration example outputs an AC voltage that varies between $-E_{N+1}$ [V] and $E_{N+1}$ [V] around 0 [V].

Therefore, in the power conversion device 1 of this configuration example, the number of required carrier waves is small. It is therefore possible to simplify the software and hardware necessary for generating carrier waves and to reduce the cost. In the power conversion device 1 of this configuration example, the control unit 5 executes the addition process on the command value in the target signal OS1. However, other configurations may be used. That is to say, the addition process may be executed by an adder provided separately from the control unit 5.

Configuration Example 2

Figure 22:
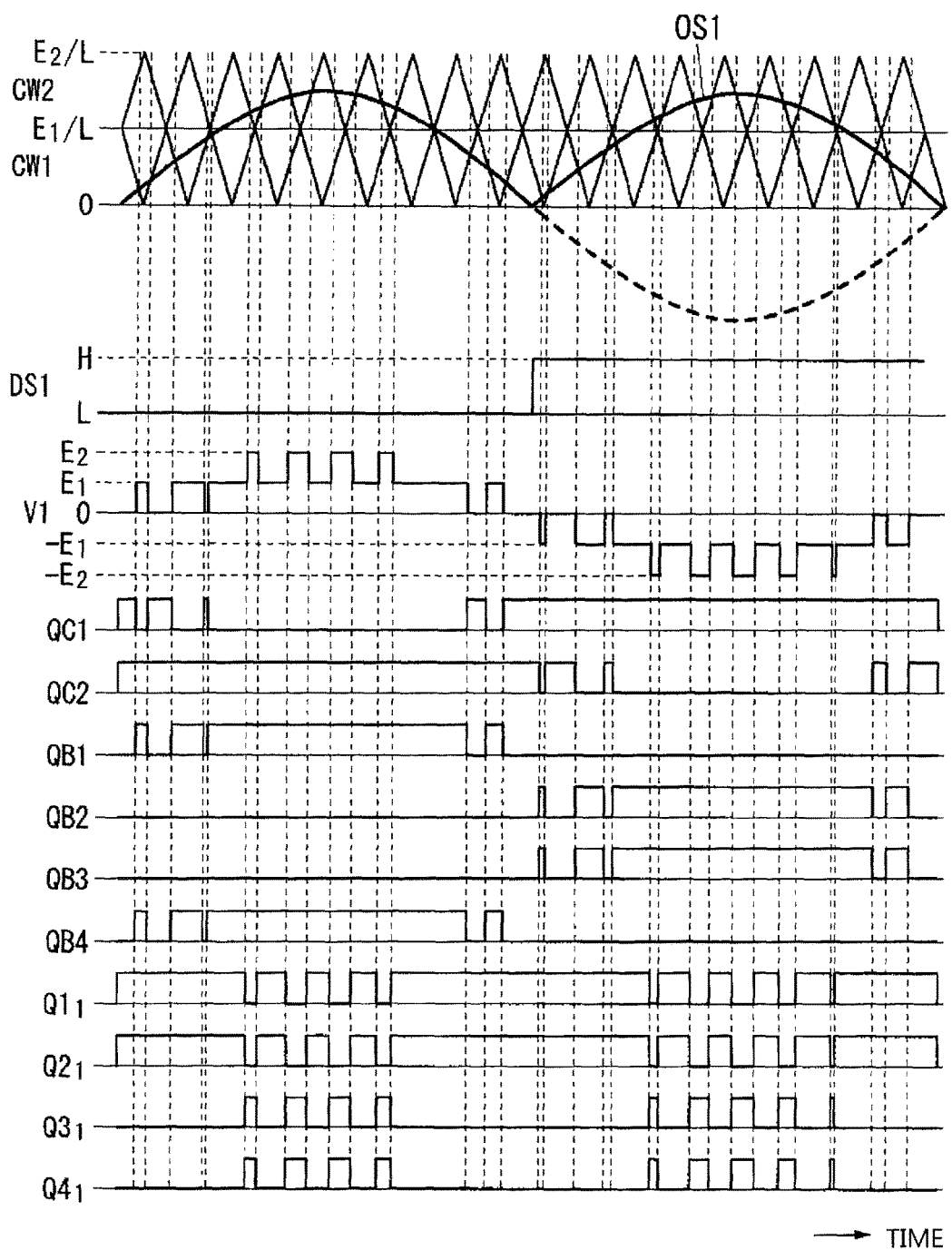
FIG. 22 is a diagram for explaining the operation of a power conversion device according to configuration example 2 of the second embodiment.

Hereinafter, the power conversion device 1 according to configuration example 2 of the present embodiment will be described with reference to FIG. 22. In the power conversion device 1 of this configuration example, unlike the power conversion device 1 of the configuration example 1, the phase of the first carrier wave CW1 is reversed. Furthermore, the target signal OS1 is a signal which is adjusted on the basis of the result of determination of whether a command value is positive or negative to fall between the minimum value and the maximum value of a plurality of carrier waves (carrier waves CW1 and CW2). In the power conversion device 1 of this configuration example, unlike the power conversion device 1 of the configuration example 1, the target signal OS1 is a signal obtained by reversing the positive or negative of a command value during a period in which the command value is negative. That is to say, as shown in FIG. 22, the target signal OS1 shows the same voltage value as the command value while the first determination signal DS1 is 'L'. When the first determination signal DS1 becomes 'H', the target signal OS1 shows a voltage value obtained by inverting the positive or negative of the command value.

The control unit 5 controls the respective switches of the voltage control unit $2_1$, the conversion unit 3 and the clamp unit 4 in accordance with the result of comparison of the carrier waves CW1 and CW2 with the target signal OS1 so that the output voltage V1 is generated according to the condition shown in the following Table 14. When the target signal OS1 is equal to any one of the carrier waves CW1 and CW2 (for example, OS1=CW1, etc.), the output voltage V1 is not limited to the condition shown in Table 14 but may be defined as appropriate.

TABLE 14

|  | DS1 | V1 (V) |
|---|---|---|
| CW2 < OS1 | L | $E_2$ |
|  | H | $-E_2$ |
| CW1 ≤ OS1 ≤ CW2 | L | $E_1$ |
|  | H | $-E_1$ |
| CW1 > OS1 | L | 0 |
|  | H | 0 |

For example, a case where the voltage value of the target signal OS1 is larger than the second carrier wave CW2 will be described. In this case, if the first determination signal DS1 is 'L', the control unit 5 switches on the second holding switch QC2 of the clamp unit 4, the switches QB1 and QB4 of the conversion unit 3 and the input switches $Q3_1$ and $Q4_1$ of the voltage control unit $2_1$, and switches off the remaining switches. As a result, the power conversion device 1 of this configuration example generates an output voltage V1 of $E_2$ [V]. When the first determination signal DS1 is 'H', the control unit 5 switches on the first holding switch QC1 of the clamp unit 4, the switches QB2 and QB3 of the conversion unit 3 and the input switches $Q3_1$ and $Q4_1$ of the voltage control unit $2_1$, and switches off the remaining switches. As a result, the power conversion device 1 of this configuration example generates an output voltage V1 of $-E_2$ [V].

As described above, in the power conversion device 1 of this configuration example, the control unit 5 controls the respective switches of the voltage control unit $2_1$, the conversion unit 3 and the clamp unit 4 according to the result of comparison of the second carrier wave CW2 and the first carrier wave CW1 having a reverser phase with the target signal OS1 and the result of determination of whether the command value is positive or negative. Thus, by suitably switching the output voltage V1 with the control unit 5, the power conversion device 1 of this configuration example outputs an AC voltage that varies between $-E_2$ [V] and $E_2$ [V] around 0 [V].

In the case where the power conversion device 1 of this configuration example includes N voltage control units $2_1$ to $2_N$, the control unit 5 performs the following control. Specifically, the control unit 5 controls the respective switches of the voltage control units $2_1$ to $2_N$, the conversion unit 3 and the clamp unit 4 according to the result of comparison of the plurality of carrier waves with the target signal OS1 and the result of determination of whether the command value is positive or negative. The carrier waves are '[(N+1)/2]' carrier waves and '[(N+1)/2]' carrier waves whose phases are inverted with respect to the '[(N+1)/2]' carrier waves. Thus, by appropriately switching the output voltage V1 with the control unit 5, the power conversion device 1 of this configuration example outputs an AC voltage that varies between $-E_{N+1}$ [V] and $E_{N+1}$ [V] around 0 [V].

The '[ ]' of '[(N+1)/2]' is a Gaussian symbol. For example, if X is a real number, [X] is an integer and satisfies the relationship of 'X−1≤[X]<X'. Thus, the '[(N+1)/2]' represents a maximum integer that does not exceed the '(N+1)/2'.

Therefore, in the power conversion device 1 of this configuration example, the number of required carrier waves is small. It is therefore possible to simplify the software and hardware necessary for generating carrier waves and to reduce the cost. In the power conversion device 1 of this configuration example, the control unit 5 executes the process of inverting the positive or negative of the command value in the target signal OS1. However, other configurations may be used. That is to say, the process of inverting the positive or negative of the command value may be executed by a multiplier provided separately from the control unit 5.

Configuration Example 3

Hereinafter, a power conversion device 1 according to configuration example 3 of the present embodiment will be described with reference to FIG. 23. In the power conversion device 1 of this configuration example, the control unit 5 controls the respective switches of the voltage control unit $2_1$, the conversion unit 3 and the clamp unit 4 in accordance with the result of comparison of the two carrier waves CW1 and CW3 with the target signal OS1 and the result of comparison of the command value with a threshold value. In this regard, '$E_1$/L' [V] which is the maximum value of the first carrier wave CW1 is defined as a first threshold value, and '$-E_1$/L' [V] which is the minimum value of the third carrier wave CW3 is defined as a second threshold value.

Figure 23:
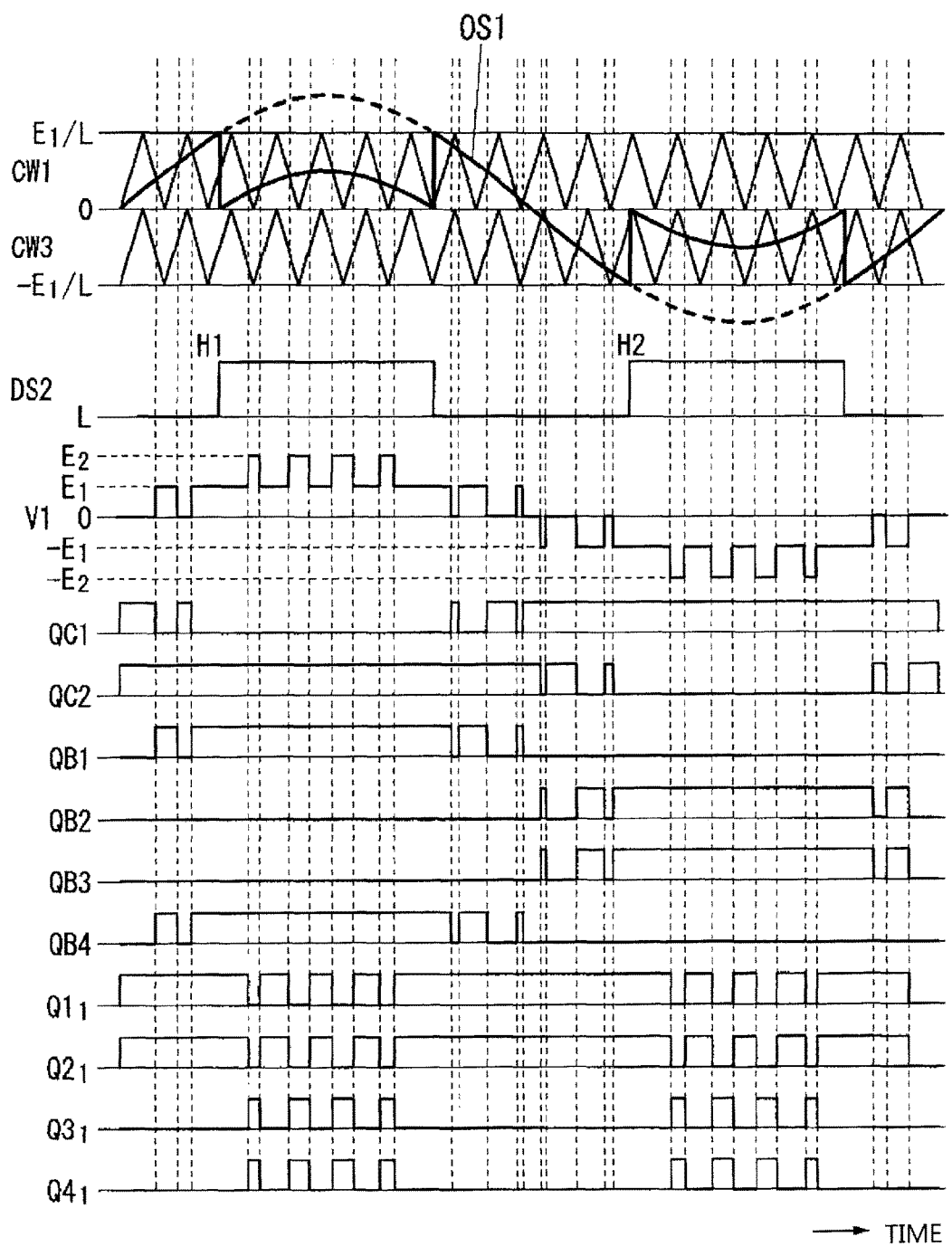
FIG. 23 is a diagram for explaining the operation of a power conversion device according to configuration example 3 of the second embodiment.

In FIG. 23, the second determination signal DS2 is a signal indicating the result of comparison of the command value with the threshold value. The second determination signal DS2 is 'H1' if the command value exceeds the first threshold value ('$E_1$/L' [V]), 'H2' if the command value is lower than the second threshold value ('$-E_1$/L' [V]), and 'L' in other cases. Furthermore, the target signal OS1 is a signal which is adjusted on the basis of the result of comparison of the command value with the threshold value so as to fall between the minimum value and the maximum value of the plurality of carrier waves (carrier waves CW1 and CW3). In the power conversion device 1 of this configuration example, the target signal OS1 is a signal obtained by subtracting the first threshold value from the command value in a period in which the command value is greater than the first threshold value and a signal obtained by subtracting the second threshold value from the command value in a period in which the command value is smaller than the second threshold value. That is to say, as shown in FIG. 23, the target signal OS1 shows the same voltage value as the command value while the second determination signal DS2 is 'L'. When the second determination signal DS2 becomes 'H1', the target signal OS1 shows a voltage value obtained by subtracting '$E_1$/L' [V] from the command value. When the second determination signal DS2 becomes 'H2', the target signal OS1 shows a voltage value obtained by subtracting '$-E_1$/L' [V] from the command value.

The control unit 5 controls the respective switches of the voltage control unit $2_1$, the conversion unit 3 and the clamp unit 4 in accordance with the result of comparison of the carrier waves CW1 and CW3 with the target signal OS1 and the second determination signal DS2 so that the output voltage V1 is generated according to the condition shown in the following Table 15. When the target signal OS1 is equal to any one of the carrier waves CW1 and CW3 (for example, OS1=CW1, etc.), the output voltage V1 is not limited to the condition shown in Table 15 but may be defined as appropriate.

TABLE 15

| | DS2 | V1 (V) |
|---|---|---|
| CW1 < OS1 | L | $E_1$ |
| | H1 | $E_2$ |
| CW3 ≤ OS1 ≤ CW1 | L | 0 |
| | H1 | $E_1$ |
| | H2 | $-E_1$ |
| CW3 > OS1 | L | $-E_1$ |
| | H2 | $-E_2$ |

For example, a case where the voltage value of the target signal OS1 is between the first carrier wave CW1 and the third carrier wave CW3 will be described. In this case, if the second determination signal DS2 is 'L', the control unit 5 switches on the holding switches QC1 and QC2 of the clamp unit 4 and the regenerative switches $Q1_1$ and $Q2_1$ of the voltage control unit $2_1$, and switches off the remaining switches. Thus, in the power conversion device 1 of this configuration example, the output voltage V1 is set to 0 [V]. When the second determination signal DS2 is 'H1', the control unit 5 switches on the second holding switch QC2 of the clamp unit 4, the switches QB1 and QB4 of the conversion unit 3 and the regenerative switches $Q1_1$ and $Q2_1$ of the voltage control unit $2_1$, and switches off the remaining switches. As a result, the power conversion device 1 of this configuration example generates an output voltage V1 of $E_1$ [V]. If the second determination signal DS2 is 'H2', the control unit 5 switches on the first holding switch QC1 of the clamp unit 4, the switches QB2 and QB3 of the conversion unit 3 and the regenerative switches $Q1_1$ and $Q2_1$ of the voltage control unit $2_1$, and switches off the remaining switches. As a result, the power conversion device 1 of this configuration example generates an output voltage V1 of $-E_1$ [V].

As described above, in the power conversion device 1 of this configuration example, the control unit 5 controls the respective switches of the voltage control unit $2_1$, the conversion unit 3 and the clamp unit 4 in accordance with the result of comparison of the two synchronized carrier waves CW1 and CW3 with the target signal OS1 and the result of comparison of the command value with the threshold value. Thus, by suitably switching the output voltage V1 with the control unit 5, the power conversion device 1 of this configuration example outputs an AC voltage that varies between $-E_2$ [V] and $E_2$ [V] around 0 [V].

In the case where the power conversion device 1 of this configuration example includes N voltage control units $2_1$ to $2_N$, the control unit 5 performs the following control. Specifically, the control unit 5 controls the respective switches of the voltage control units $2_1$ to $2_N$, the conversion unit 3 and the clamp unit 4 according to the result of comparison of the 'N+1' synchronized carrier waves with the target signal OS1 and the result of comparison of the command value with the threshold value. Thus, by appropriately switching the output voltage V1 with the control unit 5, the power conversion device 1 of this configuration example outputs an AC voltage that varies between $-E_{N+1}$ [V] and $E_{N+1}$ [V] around 0 [V].

Therefore, in the power conversion device 1 of this configuration example, the number of required carrier waves is small. It is therefore possible to simplify the software and hardware necessary for generating carrier waves and to reduce the cost. In the power conversion device 1 of this configuration example, the control unit 5 executes the subtraction process on the command value in the target signal OS1. However, other configurations may be used. That is to say, the subtraction process may be executed by a subtractor provided separately from the control unit 5.

Configuration Example 4

Figure 24:
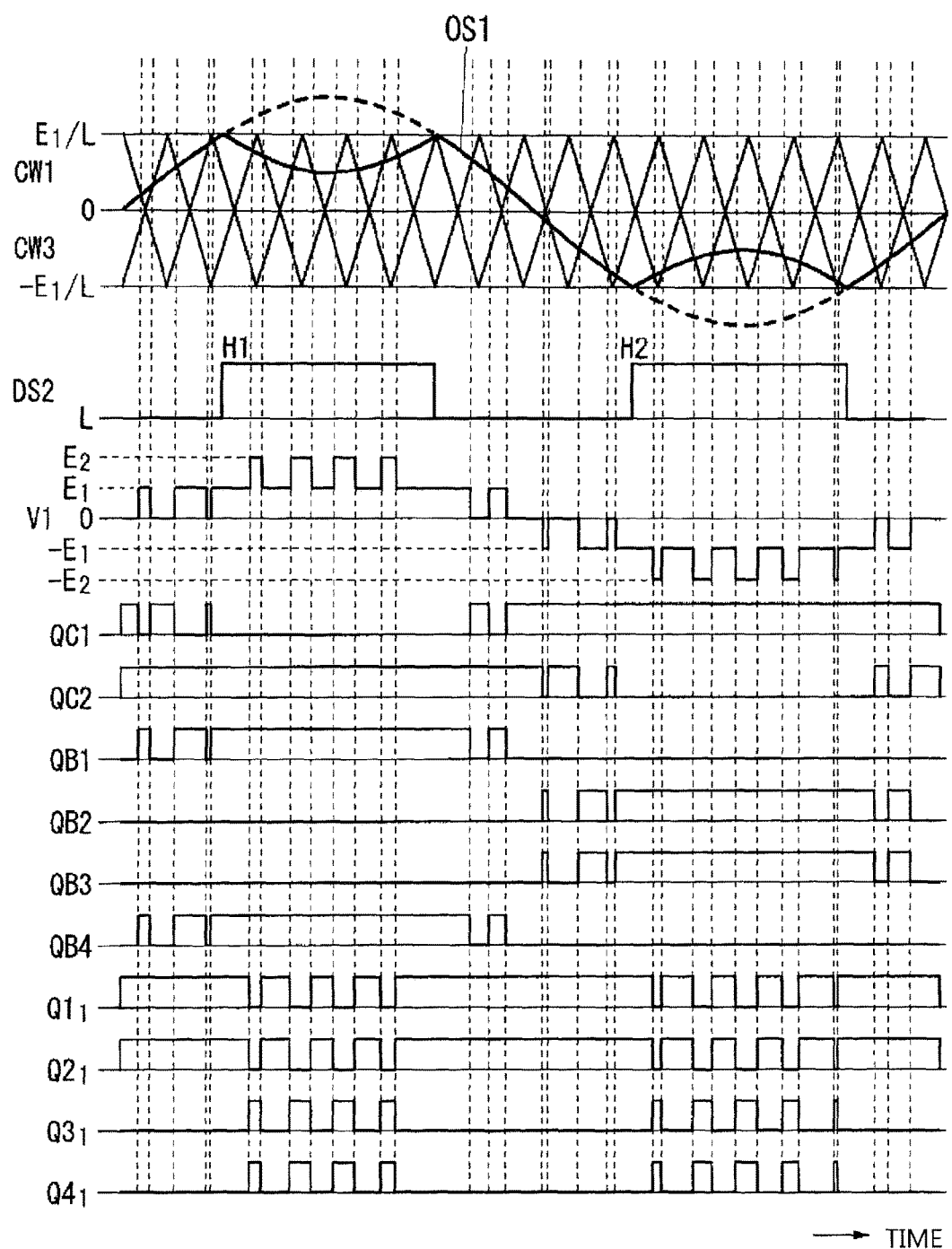
FIG. 24 is a diagram for explaining the operation of a power conversion device according to configuration example 4 of the second embodiment.

Hereinafter, the power conversion device 1 according to configuration example 4 of the present embodiment will be described with reference to FIG. 24. In the power conversion device 1 of this configuration example, unlike the power conversion device 1 of the configuration example 3, the phase of the third carrier wave CW3 is reversed. Further, the target signal OS1 is a signal which is adjusted on the basis of the result of comparison of the command value with the threshold value to fall between the minimum value and the maximum value of a plurality of carrier waves (carrier waves CW1 and CW3). In the power conversion device 1 of this configuration example, unlike the power conversion device 1 of the configuration example 3, the target signal OS1 is a signal obtained by subtracting the difference between the command value and the first threshold value from the first threshold value during a period in which the command value is greater than the first threshold value. Furthermore, the target signal OS1 is a signal obtained by subtracting the difference between the command value and the second threshold value from the second threshold value during a period in which the command value is smaller than the second threshold value. That is to say, as shown in FIG. 24, the target signal OS1 shows the same voltage value as the command value while the second determination signal DS2 is 'L'. When the second determination signal DS2 becomes 'H1', the target signal OS1 shows a voltage value obtained by subtracting the difference between the command value and '$E_1$/L' [V] from '$E_1$/L' [V]. In addition, when the second determination signal DS2 becomes 'H2', the target signal OS1 shows a voltage value obtained by subtracting the difference between the command value and '$-E_1$/L' [V] from '$-E_1$/L' [V].

The control unit 5 controls the respective switches of the voltage control unit $2_1$, the conversion unit 3 and the clamp unit 4 in accordance with the result of comparison of the carrier waves CW1 and CW3 with the target signal OS1 and the second determination signal DS2 so that the output voltage V1 is generated according to the condition shown in the following Table 16. When the target signal OS1 is equal to any one of the carrier waves CW1 and CW3 (for example, OS1=CW1, etc.), the output voltage V1 is not limited to the condition shown in Table 16 but may be defined as appropriate.

TABLE 16

| | DS2 | V1 (V) |
|---|---|---|
| CW1 < OS1 | L, H1 | $E_1$ |
| CW3 ≤ OS1 ≤ CW1 | L | 0 |
| | H1 | $E_2$ |
| | H2 | $-E_2$ |
| CW3 > OS1 | L, H2 | $-E_1$ |

For example, a case where the voltage value of the target signal OS1 is between the first carrier wave CW1 and the third carrier wave CW3 will be described. In this case, if the second determination signal DS2 is 'L', the control unit 5 switches on the holding switches QC1 and QC2 of the clamp unit 4 and the regenerative switches $Q1_1$ and $Q2_1$ of the voltage control unit $2_1$, and switches off the remaining switches. Thus, in the power conversion device 1 of this configuration example, the output voltage V1 is set to 0 [V].

If the second determination signal DS2 is 'H1', the control unit 5 switches on the second holding switch QC2 of the clamp unit 4, the switches QB1 and QB4 of the conversion unit 3 and the input switches $Q3_1$ and $Q4_1$ of the voltage control unit $2_1$, and switches off the remaining switches. As a result, the power conversion device 1 of this configuration example generates an output voltage V1 of $E_2$ [V]. If the second determination signal DS2 is 'H2', the control unit 5 switches on the first holding switch QC1 of the clamp unit 4, the switches QB2 and QB3 of the conversion unit 3 and the input switches $Q3_1$ and $Q4_1$ of the voltage control unit $2_1$, and switches off the remaining switches. As a result, the power conversion device 1 of this configuration example generates an output voltage V1 of $-E_2$ [V].

As described above, in the power conversion device 1 of this configuration example, the control unit 5 controls the respective switches of the voltage control unit $2_1$, the conversion unit 3 and the clamp unit 4 according to the result of comparison of the two carrier waves CW1 and CW3 with the target signal OS1 and the result of comparison of the command value with the threshold value. Thus, by suitably switching the output voltage V1 with the control unit 5, the power conversion device 1 of this configuration example outputs an AC voltage that varies between $-E_2$ [V] and $E_2$ [V] around 0 [V].

In the case where the power conversion device 1 of this configuration example includes N voltage control units $2_1$ to $2_N$, the control unit 5 performs the following control. Specifically, the control unit 5 controls the respective switches of the voltage control units $2_1$ to $2_N$, the conversion unit 3 and the clamp unit 4 according to the result of comparison of the plurality of carrier waves with the target signal OS1 and the result of comparison of the command value with the threshold value. The carrier waves are '[(N+1)/2]' carrier waves and '[(N+1)/2]' carrier waves whose phases are inverted with respect to the '[(N+1)/2]' carrier waves. Thus, by appropriately switching the output voltage V1 with the control unit 5, the power conversion device 1 of this configuration example outputs an AC voltage that varies between $-E_{N+1}$ [V] and $E_{N+1}$ [V] around 0 [V].

Therefore, in the power conversion device 1 of this configuration example, the number of required carrier waves is small. It is therefore possible to simplify the software and hardware necessary for generating carrier waves and to reduce the cost. In the power conversion device 1 of this configuration example, the control unit 5 executes the subtraction process on the command value in the target signal OS1. However, other configurations may be used. That is to say, the subtraction process may be executed by a subtractor provided separately from the control unit 5.

Configuration Example 5

Hereinafter, the power conversion device 1 according to configuration example 5 of the present embodiment will be described with reference to FIG. 25. In the power conversion device 1 of this configuration example, the control unit 5 controls the respective switches of the voltage control unit $2_1$, the conversion unit 3 and the clamp unit 4 according to the result of comparison of the first carrier wave CW1 with the target signal OS1, the result of determination of whether the command value is positive or negative and the result of comparison of the command value with the threshold value. In this regard, '$E_1$/L' [V] which is the maximum value of the first carrier wave CW1 is defined as a first threshold value, and '$-E_1$/L' [V] obtained by inverting the maximum value of the first carrier wave CW1 is defined as a second threshold value.

In the power conversion device 1 of this configuration example, the second determination signal DS2 is 'H1' if the command value exceeds the first threshold value when the first determination signal DS1 is 'L', 'H2' if the command value falls below the second threshold value when the first determination signal DS1 is 'H', and 'L' in other cases.

Furthermore, the target signal OS1 is a signal which is adjusted on the basis of the result of determination of whether the command value is positive or negative and the result of comparison of the command value with the threshold value to fall between the minimum value and the maximum value of one carrier wave (the first carrier wave CW1). In the power conversion device 1 of this configuration example, the target signal OS1 is a signal obtained by subtracting the first threshold value from the command value in a period in which the command value is positive and is greater than the first threshold value. Furthermore, the target signal OS1 is a signal obtained by adding the first threshold value to the command value in a period in which the command value is negative. Moreover, the target signal OS1 is a signal obtained by further adding the first threshold value to the added command value in a period in which the command value is negative and is smaller than the second threshold value.

Figure 25:
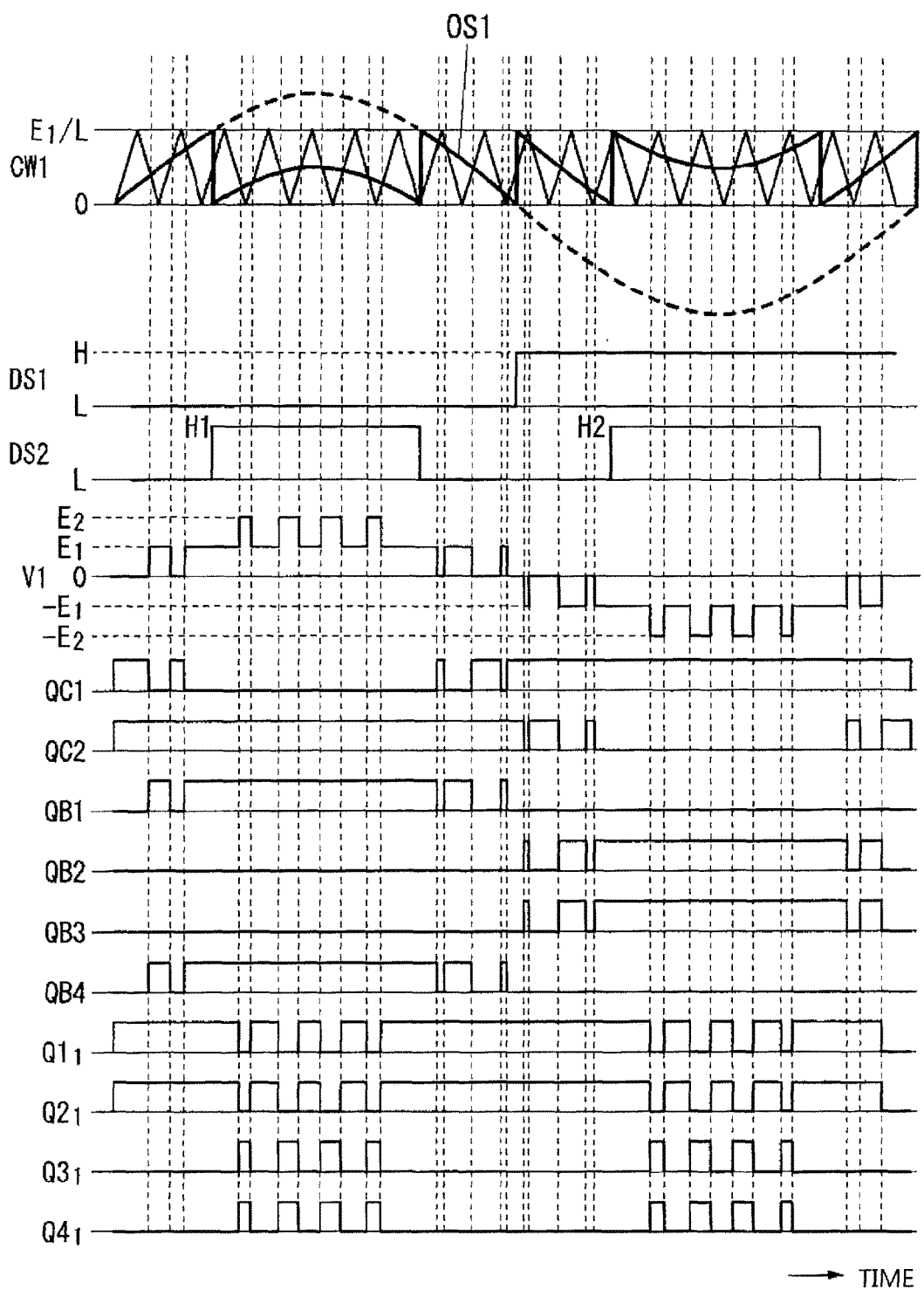
FIG. 25 is a diagram for explaining the operation of a power conversion device according to configuration example 5 of the second embodiment.

That is to say, as shown in FIG. 25, the target signal OS1 shows the same voltage value as the command value while the first determination signal DS1 is 'L' and the second determination signal DS2 is 'L'. When the second determination signal DS2 becomes 'H1', the target signal OS1 indicates a voltage value obtained by subtracting '$E_1$/L' [V] from the command value. Furthermore, the target signal OS1 indicates a voltage value obtained by adding '$E_1$/L' [V] to the command value while the first determination signal DS1 is 'H' and the second determination signal DS2 is 'L'. Then, when the second determination signal DS2 becomes 'H2', the target signal OS1 shows a voltage value obtained by further adding '$E_1$/L' [V] to the command value to which '$E_1$/L' [V] is added.

The control unit 5 controls the respective switches of the voltage control unit $2_1$, the conversion unit 3 and the clamp unit 4 in accordance with the result of comparison of the first carrier wave CW1 with the target signal OS1, the first determination signal DS1 and the second determination signal DS2 so that the output voltage V1 is generated according to the condition shown in the following Table 17. When the target signal OS1 is equal to the carrier wave CW1, the output voltage V1 is not limited to the condition shown in Table 17 but may be defined as appropriate.

TABLE 17

| | DS1 | DS2 | V1 (V) |
|---|---|---|---|
| CW1 < OS1 | L | L | $E_1$ |
| | | H1 | $E_2$ |
| | H | L | 0 |
| | | H2 | $-E_1$ |
| CW1 ≥ OS1 | L | L | 0 |
| | | H1 | $E_1$ |
| | H | L | $-E_1$ |
| | | H2 | $-E_2$ |

For example, a case where the voltage value of the target signal OS1 is larger than the first carrier wave CW1 and the first determination signal DS1 is 'L' will be described. In this case, if the second determination signal DS2 is 'L', the control unit 5 switches on the second holding switch QC2 of the clamp unit 4, the switches QB1 and QB4 of the conversion unit 3 and the regenerative switches $Q1_1$ and $Q2_1$ of the voltage control unit $2_1$, and switches off the remaining switches. As a result, the power conversion device 1 of this configuration example generates an output voltage V1 of $E_1$ [V]. If the second determination signal DS2 is 'H1', the control unit 5 switches on the second holding switch QC2 of the clamp unit 4, the switches QB1 and QB4 of the conversion unit 3 and the input switches $Q3_1$ and $Q4_1$ of the voltage control unit $2_1$, and switches off the remaining switches. As a result, the power conversion device 1 of this configuration example generates an output voltage V1 of $E_2$ [V].

As described above, in the power conversion device 1 of this configuration example, the control unit 5 controls the respective switches of the voltage control section $2_1$, the conversion unit 3 and the clamp unit 4 according to the result of comparison of one carrier wave CW1 with the target signal OS1, the result of determination of whether the command value is positive or negative, and the result of comparison of the command value with the threshold value. Thus, by suitably switching the output voltage V1 with the control unit 5, the power conversion device 1 of this configuration example outputs an AC voltage that varies between $-E_2$ [V] and $E_2$ [V] around 0 [V].

In the case where the power conversion device 1 of this configuration example includes N voltage control units $2_1$ to $2_N$, the control unit 5 performs the following control. Specifically, the control unit 5 controls the respective switches of the voltage control units $2_1$ to $2_N$, the conversion unit 3 and the clamp unit 4 according to the result of comparison of one carrier wave CW1 with the target signal OS1, the result of determination of whether the command value is positive or negative, and the result of comparison of the command value with the threshold value. Thus, by appropriately switching the output voltage V1 with the control unit 5, the power conversion device 1 of this configuration example outputs an AC voltage that varies between $-E_{N+1}$ [V] and $E_{N+1}$ [V] around 0 [V].

Therefore, in the power conversion device 1 of this configuration example, the number of required carrier waves is one. It is therefore possible to simplify the software and hardware necessary for generating carrier waves and to reduce the cost. Since the power conversion device 1 of this configuration example uses one carrier wave, there is no need to synchronize a plurality of carrier waves. In the power conversion device 1 of this configuration example, the control unit 5 executes the addition process and the subtraction process with respect to the command value in the target signal OS1. However, other configurations may be used. That is to say, the addition process may be performed by an adder provided separately from the control unit 5, and the subtraction process may be executed by a subtractor provided separately from the control unit 5.

Configuration Example 6

Hereinafter, the power conversion device 1 according to configuration example 6 of the present embodiment will be described with reference to FIG. 26. In the power conversion device 1 of this configuration example, unlike the power conversion device 1 of the configuration example 5, the target signal OS1 is a signal obtained by subtracting the difference between the command value and the first threshold value from the first threshold value in a period in which the command value is positive and is greater than the first threshold value. Furthermore, the target signal OS1 is a signal obtained by inverting the positive or negative of the command value in a period in which the command value is negative. Moreover, the target signal OS1 is a signal obtained by subtracting the difference between the inverted command value and the first threshold value from the first threshold value in a period in which the command value is negative and is smaller than the second threshold value.

Figure 26:
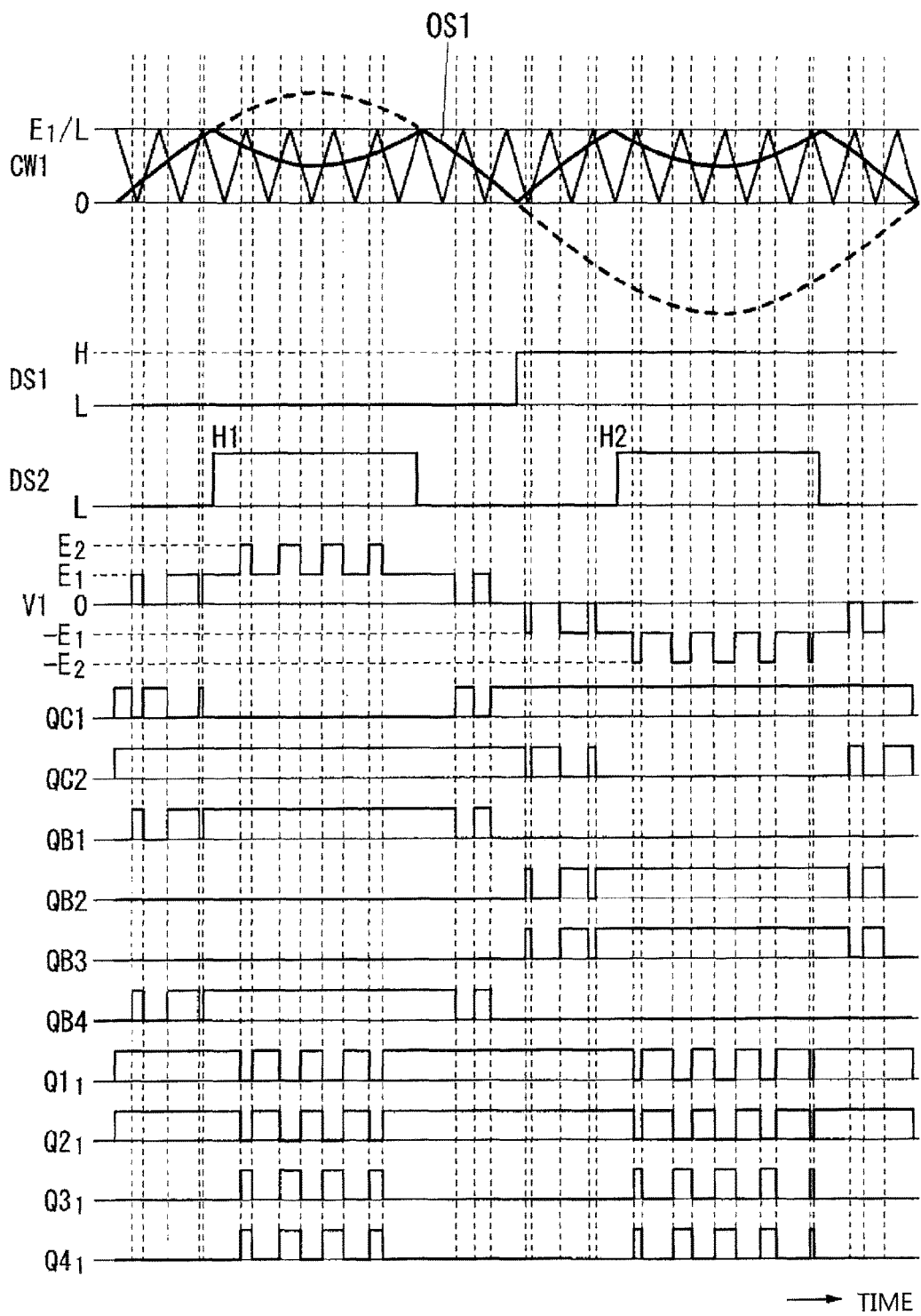
FIG. 26 is a diagram for explaining the operation of a power conversion device according to configuration example 6 of the second embodiment.

Specifically, as shown in FIG. 26, the target signal OS1 shows the same voltage value as the command value while the first determination signal DS1 is 'L' and the second determination signal DS2 is 'L'. Then, when the second determination signal DS2 becomes 'H1', the target signal OS1 indicates a voltage value obtained by subtracting the difference between the command value and '$E_1/L$' [V] from '$E_1/L$' [V]. Moreover, the target signal OS1 indicates a voltage value obtained by inverting the positive or negative of the command value while the first determination signal DS1 is 'H' and the second determination signal DS2 is 'L'. Then, when the second determination signal DS2 becomes 'H2', the target signal OS1 shows a voltage value obtained by subtracting the difference between the inverted command value and '$E_1/L$' [V] from '$E_1/L$' [V].

The control unit 5 controls the respective switches of the voltage control unit $2_1$, the conversion unit 3 and the clamp unit 4 in accordance with the result of comparison of the first carrier wave CW1 with the target signal OS1, the first determination signal DS1 and the second determination signal DS2 so that the output voltage V1 is generated according to the condition shown in the following Table 18. When the target signal OS1 is equal to the carrier wave CW1, the output voltage V1 is not limited to the condition shown in Table 18 but may be defined as appropriate.

TABLE 18

|  | DS1 | DS2 | V1 (V) |
| --- | --- | --- | --- |
| CW1 < OS1 | L | L, H1 | $E_1$ |
|  | H | L, H2 | $-E_1$ |
| CW1 ≥ OS1 | L | L | 0 |
|  |  | H1 | $E_2$ |
|  | H | L | 0 |
|  |  | H2 | $-E_2$ |

For example, a case where the voltage value of the target signal OS1 is smaller than the first carrier wave CW1 and the first determination signal DS1 is 'L' will be described. In this case, if the second determination signal DS2 is 'L', the control unit 5 switches on the holding switches QC1 and QC2 of the clamp unit 4 and the regenerative switches $Q1_1$ and $Q2_1$ of the voltage control unit $2_1$, and switches off the remaining switches. Thus, in the power conversion device 1 of this configuration example, the output voltage V1 is set to 0 [V]. If the second determination signal DS2 is 'H1', the control unit 5 switches on the second holding switch QC2 of the clamp unit 4, the switches QB1 and QB4 of the conversion unit 3 and the input switches $Q3_1$ and $Q4_1$ of the voltage control unit $2_1$, and switches off the remaining switches. As a result, the power conversion device 1 of this configuration example generates an output voltage V1 of $E_2$ [V].

The power conversion device 1 of this configuration example can achieve the same effects as achieved by the power conversion device 1 of the configuration example 5. In the power conversion device 1 of this configuration example, the control unit 5 executes the process of inverting the positive or negative of the command value and the subtraction process with respect to the command value in the target signal OS1. However, other configurations may be used. That is to say, the process of inverting the positive or negative of the command value may be executed by a multiplier provided separately from the control unit 5, and the subtraction process may be executed by a subtractor provided separately from the control unit 5.

What is claimed is:

1. A power conversion device, comprising:
a first input point and a second input point to which a main voltage source is electrically connected;
a first output point and a second output point;
N number of voltage control units to which voltage sources having mutually different power source voltages are electrically connected;
a conversion unit provided with four switches and configured to invert the polarity of an input DC voltage to generate an output voltage at the first output point and the second output point; and
a clamp unit provided with a holding switch and configured to hold the output voltage at a predetermined voltage,
wherein the number N of the voltage control units is an integer of 1 or more,
each of the N voltage control units includes a pair of regenerative switches configured to open and close an electrical path interconnecting the corresponding voltage source and the conversion unit and a pair of input switches configured to open and close an electrical path interconnecting the main voltage source and the conversion unit, and
the power conversion device further comprises a control unit configured to switch the output voltage in 2N+3 steps by controlling the four switches of the conversion unit, the holding switch, the pair of regenerative switches and the pair of input switches of each of the N voltage control units.

2. The power conversion device of claim 1, wherein when the output voltage is a power source voltage of a voltage source electrically connected to an arbitrary voltage control unit of the N voltage control units and when the output voltage is a power source voltage lower than the power source voltage by one step, the control unit keeps the pair of regenerative switches of the arbitrary voltage control unit in an on state.

3. The power conversion device of claim 1, wherein the clamp unit is composed of a series circuit of a pair of holding switches electrically connected between a pair of output points of the conversion unit, and
the control unit keeps a second holding switch of the pair of holding switches in an on state when the output voltage is larger than a predetermined voltage, and keeps a first holding switch of the pair of holding switches in an on state when the output voltage is smaller than the predetermined voltage.

4. The power conversion device of claim 1, wherein the control unit controls the four switches of the conversion unit, the holding switch, and the pair of regenerative switches and the pair of input switches of each of the N voltage control units in accordance with a result of comparison of N×2+2 synchronized carrier waves with a command value of a desired AC voltage.

5. The power conversion device of claim 1, wherein the control unit controls the four switches of the conversion unit, the holding switch, and the pair of regenerative switches and the pair of input switches of each of the N voltage control units in accordance with a result of comparison of N+1 carrier waves and N+1 carriers waves having phases inverted with respect to the N+1 carrier waves with a command value of a desired AC voltage.

6. The power conversion device of claim 1, wherein the control unit controls the four switches of the conversion unit, the holding switch, and the pair of regenerative switches and the pair of input switches of each of the N voltage control units in accordance with a result of comparison of N+1 synchronized carrier waves with a target signal corresponding to a command value of a desired AC voltage and a result of determination of whether the command value is positive or negative, and
the target signal is a signal which is obtained by adjusting the command value of the desired AC voltage on the basis of the result of determination of whether the command value is positive or negative to fall between a minimum value and a maximum value of the carrier waves.

7. The power conversion device of claim 1, wherein the control unit controls the four switches of the conversion unit, the holding switch, and the pair of regenerative switches and the pair of input switches of each of the N voltage control units in accordance with a result of comparison of a plurality of carrier waves with a target signal corresponding to a command value of a desired AC voltage and a result of determination of whether the command value is positive or negative,
the carrier waves are [(N+1)/2] carrier waves and [(N+1)/2] carrier waves whose phases are inverted with respect to the [(N+1)/2] carrier waves, and
the target signal is a signal which is obtained by adjusting the command value of the desired AC voltage on the basis of the result of determination of whether the command value is positive or negative to fall between a minimum value and a maximum value of the carrier waves.

8. The power conversion device of claim 1, wherein the control unit controls the four switches of the conversion unit, the holding switch, and the pair of regenerative switches and the pair of input switches of each of the N voltage control units in accordance with a result of comparison of N+1 synchronized carrier waves with a target signal corresponding to a command value of a desired AC voltage and a result of comparison of the command value with a threshold value, and
the target signal is a signal which is obtained by adjusting the command value of the desired AC voltage on the basis of the result of comparison of the command value with the threshold value to fall between a minimum value and a maximum value of the carrier waves.

9. The power conversion device of claim 1, wherein the control unit controls the four switches of the conversion unit, the holding switch, and the pair of regenerative switches and the pair of input switches of each of the N voltage control units in accordance with a result of comparison of a plurality of carrier waves with a target signal corresponding to a command value of a desired AC voltage and a result of comparison of the command value with a threshold value,
the carrier waves are [(N+1)/2] carrier waves and [(N+1)/2] carrier waves whose phases are inverted with respect to the [(N+1)/2] carrier waves, and
the target signal is a signal which is obtained by adjusting the command value of the desired AC voltage on the basis of the result of comparison of the command value with the threshold value to fall between a minimum value and a maximum value of the carrier waves.

10. The power conversion device of claim 1, wherein the control unit controls the four switches of the conversion unit, the holding switch, and the pair of regenerative switches and the pair of input switches of each of the N voltage control units in accordance with a result of comparison of one carrier wave with a target signal corresponding to a command value of a desired AC voltage, a result of determination of whether the command value is positive or negative and a result of comparison of the command value with a threshold value, and the target signal is a signal which is obtained by adjusting the command value of the desired AC voltage on the basis of the result of determination of whether the command value is positive or negative and the result of comparison of the command value with the threshold value so as to fall between a minimum value and a maximum value of the one carrier wave.

11. The power conversion device of claim 1, wherein the control unit drives the pair of regenerative switches in an arbitrary voltage control unit, the pair of input switches in the arbitrary voltage control unit, or at least one of a high-side switch of a first leg of a pair of legs of the conversion unit and a low-side switch of a second leg of the pair of legs of the conversion unit with one drive signal.

12. The power conversion device of claim 1, wherein the control unit controls the four switches of the conversion unit, the holding switch, and the pair of regenerative switches and the pair of input switches of each of the N voltage control units to provide a dead time when changing the output voltage, and at the dead time, the control unit performs control to maintain, in an on state, the switch kept in the on state before or after the change of the output voltage, and to switch off other switches.

13. The power conversion device of claim 12, wherein the control unit controls the respective switches of the N voltage control units, the conversion unit and the clamp unit to change the output voltage step by step.

14. The power conversion device of claim 1, wherein each of the four switches of the conversion unit and the holding switch is an insulated gate bipolar transistor, and an emitter of any one of the four switches of the conversion unit is electrically connected to an emitter of the holding switch.

15. The power conversion device of claim 1, wherein each of the four switches of the conversion unit and the pair of regenerative switches and the pair of input switches of each of the N voltage control units is an insulated gate bipolar transistor, an emitter of any one of the four switches of the conversion unit is electrically connected to an emitter of any one of the pair of regenerative switches of a voltage control unit electrically connected directly to the conversion unit, and an emitter of any one of the pair of input switches of an arbitrary voltage control unit is electrically connected to an emitter of any one of the pair of regenerative switches of the voltage control unit of the next stage.

16. The power conversion device of claim 1, wherein if an integer between 1 and N inclusive is denoted by M, a voltage source whose power source voltage is M/(N+1) of a power source voltage of the main voltage source is electrically connected to an $M^{th}$ voltage control unit counted from a voltage control unit directly electrically connected to the conversion unit.

17. The power conversion device of claim 1, wherein a system power source is electrically connected to the first output point and the second output point, and the control unit controls the four switches of the conversion unit, the holding switch, and the pair of regenerative switches and the pair of input switches of each of the N voltage control units so that a phase of an output AC voltage is opposite to a phase of a power source voltage of the system power source.

18. The power conversion device of claim 1, wherein a system power source is electrically connected to the first output point and the second output point, the control unit has a function of measuring a power source frequency of the system power source, and the control unit controls the four switches of the conversion unit, the holding switch, and the pair of regenerative switches and the pair of input switches of each of the N voltage control units so that a phase of an output AC voltage is shifted from a phase of a power source voltage of the system power source.

* * * * *